US011972094B2

(12) United States Patent
Timonen et al.

(10) Patent No.: US 11,972,094 B2
(45) Date of Patent: Apr. 30, 2024

(54) AUGMENTED OR VIRTUAL REALITY (AR/VR) COMPANION DEVICE TECHNIQUES

(71) Applicant: eBay Inc., San Jose, CA (US)

(72) Inventors: Joshua Reino Timonen, Portland, OR (US); Andrew Chalkley, Milwaukie, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/406,881

(22) Filed: Aug. 19, 2021

(65) Prior Publication Data
US 2021/0382591 A1 Dec. 9, 2021

Related U.S. Application Data

(63) Continuation of application No. 16/353,333, filed on Mar. 14, 2019, now Pat. No. 11,150,788.

(51) Int. Cl.
G06F 3/0484 (2022.01)
G06F 3/01 (2006.01)
(Continued)

(52) U.S. Cl.
CPC ............ *G06F 3/0484* (2013.01); *G06F 3/011* (2013.01); *G06F 3/1423* (2013.01); *H04W 76/14* (2018.02)

(58) Field of Classification Search
CPC ...... G06F 3/0484; G06F 3/011; G06F 3/1423; H04W 76/14
See application file for complete search history.

(56) References Cited

U.S. PATENT DOCUMENTS 6,226,669 B1    5/2001   Huang et al.
7,681,114 B2    3/2010   Ambrosino et al.
(Continued)

FOREIGN PATENT DOCUMENTS

CN    107111996 A    8/2017
CN    107251102 A    10/2017
(Continued)

OTHER PUBLICATIONS

U.S. Appl. No. 17/115,257, "Corrected Notice of Allowability Received for U.S. Appl. No. 17/115,257, dated Jan. 18, 2022", dated Jan. 18, 2022, 2 Pages.
(Continued)

*Primary Examiner* — Tadesse Hailu
(74) *Attorney, Agent, or Firm* — FIG. 1 Patents

(57) ABSTRACT

An augmented reality or virtual reality (AR/VR) device pairs with a companion device to augment input interfaces associated with an AR/VR application at the AR/VR device. In implementations, an AR/VR device determines a portion of a markup file that corresponds to an AR/VR scene of a plurality of AR/VR scenes in an AR/VR environment, and communicates the portion of the markup file to the companion device to cause the companion device to configure a companion user interface associated with initiating an action as part of the AR/VR scene. In response to receiving user input via the companion user interface, the companion device communicates the action to the AR/VR device to initiate the action. The AR/VR device receives input data from the companion device, and initiates the action for the AR/VR scene.

20 Claims, 15 Drawing Sheets

(51) Int. Cl.
  *G06F 3/14* (2006.01)
  *H04W 76/14* (2018.01)

(56) References Cited

U.S. PATENT DOCUMENTS

| | | | |
|---|---|---|---|
| 8,572,207 B2 | 10/2013 | Shuster et al. | |
| 9,767,768 B2 | 9/2017 | Venkitaraman et al. | |
| 9,791,917 B2 | 10/2017 | Kamhi et al. | |
| 9,846,972 B2 | 12/2017 | Montgomerie et al. | |
| 10,412,467 B2 | 9/2019 | Love et al. | |
| 10,460,485 B2 | 10/2019 | Wittkopf et al. | |
| 10,768,421 B1* | 9/2020 | Rosenberg | G02B 27/0172 |
| 10,803,832 B2 | 10/2020 | Chung et al. | |
| 10,890,992 B2 | 1/2021 | Timonen et al. | |
| 10,937,391 B2 | 3/2021 | Griswold et al. | |
| 11,150,788 B2 | 10/2021 | Timonen et al. | |
| 11,294,482 B2 | 4/2022 | Timonen et al. | |
| 11,378,805 B2* | 7/2022 | Watanabe | G02B 27/0172 |
| 11,650,678 B2 | 5/2023 | Timonen et al. | |
| 2010/0164990 A1 | 7/2010 | Van Doorn | |
| 2012/0218171 A1 | 8/2012 | Fujigaki | |
| 2013/0044128 A1* | 2/2013 | Liu | G02B 27/017 345/633 |
| 2013/0044129 A1* | 2/2013 | Latta | H04N 13/344 345/633 |
| 2013/0124186 A1 | 5/2013 | Donabedian et al. | |
| 2013/0147836 A1* | 6/2013 | Small | G06T 19/006 345/633 |
| 2013/0257900 A1* | 10/2013 | Brahmakal | G01C 21/3679 345/619 |
| 2014/0337634 A1 | 11/2014 | Starner et al. | |
| 2015/0062158 A1 | 3/2015 | Hildreth et al. | |
| 2015/0206349 A1 | 7/2015 | Rosenthal et al. | |
| 2015/0228153 A1 | 8/2015 | Hedrick et al. | |
| 2015/0286976 A1 | 10/2015 | Hirschfeld et al. | |
| 2015/0294385 A1* | 10/2015 | Grigg | G06Q 30/0613 705/26.41 |
| 2015/0371221 A1* | 12/2015 | Wardman | G06Q 20/4097 705/67 |
| 2016/0093108 A1* | 3/2016 | Mao | G02B 27/017 345/633 |
| 2016/0155187 A1 | 6/2016 | Paulrajan et al. | |
| 2016/0171486 A1 | 6/2016 | Wagner et al. | |
| 2016/0232715 A1 | 8/2016 | Lee | |
| 2016/0343164 A1 | 11/2016 | Urbach et al. | |
| 2017/0032574 A1 | 2/2017 | Sugaya | |
| 2017/0169616 A1 | 6/2017 | Wiley et al. | |
| 2017/0245757 A1* | 8/2017 | Sales | G09B 5/06 |
| 2017/0277412 A1 | 9/2017 | Curtis et al. | |
| 2017/0330187 A1* | 11/2017 | Kohli | G06Q 20/382 |
| 2018/0060333 A1 | 3/2018 | Bosch et al. | |
| 2018/0089904 A1 | 3/2018 | Jurgenson et al. | |
| 2018/0107839 A1* | 4/2018 | Clement | G06F 3/017 |
| 2018/0157820 A1* | 6/2018 | Adams | G06F 3/017 |
| 2018/0164877 A1 | 6/2018 | Miller et al. | |
| 2018/0203579 A1 | 7/2018 | Green et al. | |
| 2018/0268775 A1 | 9/2018 | Horneff et al. | |
| 2018/0321493 A1 | 11/2018 | Kim et al. | |
| 2018/0329209 A1* | 11/2018 | Nattukallingal | G02B 27/01 |
| 2018/0341811 A1 | 11/2018 | Bendale et al. | |
| 2018/0365405 A1 | 12/2018 | Mistry | |
| 2019/0043447 A1 | 2/2019 | Chung et al. | |
| 2019/0065027 A1 | 2/2019 | Hauenstein et al. | |
| 2019/0066079 A1 | 2/2019 | Liu et al. | |
| 2019/0075610 A1 | 3/2019 | Ko et al. | |
| 2019/0124084 A1* | 4/2019 | Pieczul | H04L 63/0435 |
| 2019/0196663 A1 | 6/2019 | Monastyrshyn et al. | |
| 2019/0206130 A1* | 7/2019 | Ericson | G06Q 30/0643 |
| 2019/0244436 A1* | 8/2019 | Stansell | G06F 3/0482 |
| 2019/0304406 A1 | 10/2019 | Griswold et al. | |
| 2019/0310758 A1 | 10/2019 | Agarawala et al. | |
| 2019/0313059 A1 | 10/2019 | Agarawala et al. | |
| 2019/0354761 A1 | 11/2019 | Arshad et al. | |
| 2020/0082628 A1* | 3/2020 | Jones | G06T 7/70 |
| 2020/0293120 A1 | 9/2020 | Timonen et al. | |
| 2020/0293166 A1 | 9/2020 | Timonen et al. | |
| 2021/0089139 A1 | 3/2021 | Timonen et al. | |
| 2021/0192854 A1* | 6/2021 | Ryu | G06T 7/73 |
| 2022/0179503 A1 | 6/2022 | Timonen et al. | |
| 2023/0236682 A1 | 7/2023 | Timonen et al. | |

FOREIGN PATENT DOCUMENTS

| | | |
|---|---|---|
| WO | 2018/106735 A1 | 6/2018 |
| WO | 2020/185310 A1 | 9/2020 |
| WO | 2020/185311 A1 | 9/2020 |

OTHER PUBLICATIONS

U.S. Appl. No. 16/353,333, filed Mar. 14, 2019, Allowed.
U.S. Appl. No. 17/678,888, "Non-Final Office Action received for U.S. Appl. No. 17/678,888, dated Aug. 22, 2022", dated Aug. 22, 2022, 11 Pages.
Reitmayr et al., "Mobile Collaborative Augmented Reality", Retrieved from internet URL :<https://data.icg.tugraz.at/~dieter/publications/Schmalstieg_050.pdf>, Proceedings IEEE and ACM International Symposium on Augmented Reality, Oct. 29-30, 2001, 10 pages.
International Written Opinion received for PCT Application No. PCT/US2020/014837, dated May 13, 2020, 7 pages.
International Search Report received for PCT Application No. PCT/US2020/014837, dated May 13, 2020, 6 Pages.
Google VR, "The Controller Emulator (Deprecated)", Retrieved from the internet URL;<https://developers.google.com/vr/daydream/controller-emulator>, Accessed on Mar. 13, 2019, 5 pages.
Budhiraja et al., "Using a HHD with a HMD for Mobile AR Interaction", Science and Technology Proceedings, IEEE, Oct. 2013, 6 pages.
Amazon, "Amazon Sumerian User Guide", 2019, 112 pages.
Non Final Office Action Received for U.S. Appl. No. 17/115,257, dated Jul. 12, 2021, 7 pages.
Notice of Allowance received for U.S. Appl. No. 16/353,428, dated Sep. 10, 2020, 7 pages.
International Search Report received for PCT Application No. PCT/US2020/014832, dated Apr. 28, 2020, 4 pages.
International Written Opinion received for PCT Application No. PCT/US2020/014832, dated Apr. 28, 2020, 7 pages.
Corrected Notice of Allowability Received for U.S. Appl. No. 16/353,333, dated May 27, 2021, 3 Pages.
Corrected Notice of Allowability Received for U.S. Appl. No. 16/353,333, dated Sep. 23, 2021, 3 Pages.
Corrected Notice of Allowability received for U.S. Appl. No. 16/353,333, dated Aug. 11, 2021, 3 pages.
Corrected Notice Of Allowability received for U.S. Appl. No. 16/353,333, dated Jun. 18, 2021, 2 Pages.
Final Office Action Received for U.S. Appl. No. 16/353,333, dated Aug. 4, 2020, 14 pages.
Non Final Office Action Received for U.S. Appl. No. 16/353,333, dated Feb. 21, 2020, 13 pages.
Non Final Office Action Received for U.S. Appl. No. 16/353,333, dated Nov. 10, 2020, 17 pages.
Notice of Allowance Received for U.S. Appl. No. 16/353,333, dated May 19, 2021, 9 pages.
Non Final Office Action Received for U.S. Appl. No. 16/353,428, dated Apr. 14, 2020, 8 pages.
International Preliminary Report on Patentability received for PCT Patent Application No. PCT/US2020/014837, dated Sep. 23, 2021, 9 pages.
International Preliminary Report on Patentability received for PCT Application No. PCT/US2020/014832, dated Sep. 23, 2021, 8 Pages.
Notice of Allowance received for U.S. Appl. No. 17/115,257, dated Nov. 23, 2021, 8 pages.
U.S. Appl. No. 17/678,888, "Corrected Notice of Allowability", U.S. Appl. No. 17/678,888, dated Jan. 9, 2023, 2 pages.
U.S. Appl. No. 17/678,888, "Notice of Allowance", U.S. Appl. No. 17/678,888, dated Dec. 30, 2022, 8 pages.
U.S. Appl. No. 18/193,558, "Non-Final Office Action", U.S. Appl. No. 18/193,558, dated Jul. 17, 2023, 5 pages.

(56) References Cited

OTHER PUBLICATIONS 20708311.4, "Foreign Office Action", EP Application No. 20708311.4, dated Jul. 11, 2023, 9 pages.
EP20708312.2, "Foreign Office Action", Communication pursuant to Article 94(3) EPC received for European Patent Application No. 20708312.2, dated Jul. 11, 2023, 4 pages.
U.S. Appl. No. 18/193,558, "Corrected Notice of Allowability", U.S. Appl. No. 18/193,558, Jan. 29, 2024, 2 pages.
U.S. Appl. No. 18/193,558, "Notice of Allowance", U.S. Appl. No. 18/193,558, Nov. 27, 2023, 9 pages.
202080013540.7, "Foreign Office Action", CN Application No. 202080013540.7, Jan. 2, 2024, 9 pages.
202080013795.3, "Foreign Office Action", CN Application No. 202080013795.3, Dec. 2, 2023, 22 pages.

* cited by examiner

500

502
Display a network address by an AR/VR device of a service provider system, via which, pairing data is available

504
Enter the network address into a browser of the companion device

506
Obtain the pairing data from the network address by the companion device

508
Display the pairing data obtained from the network address on a display device of the companion device

510
Capture a digital image of the pairing data using a digital camera of the AR/VR device

512
Verify the pairing data by the AR/VR device

514
Pair the AR/VR device as communicatively coupled with the companion device responsive to the verifying

602
Receive companion data at the companion device from the AR/VR device responsive to the pairing

604
Generate a companion user interface based on the companion data that supports user interaction via the companion device to initiate an action as part of an AR/VR environment output by the AR/VR device

606
Receive a user input to initiate the action via the companion user interface

608
Communicate input data by the companion device for receipt by the AR/VR device to initiate the action as part of the AR/VR environment

610
Receive the input data by the AR/VR device

612
Initiate the action for the AR/VR environment output by the AR/VR device based on the input data

*Fig. 6*

AUGMENTED OR VIRTUAL REALITY (AR/VR) COMPANION DEVICE TECHNIQUES

RELATED APPLICATION

This application is a continuation of and claims priority to U.S. patent application Ser. No. 16/353,333, filed Jun. 14, 2019, entitled "Augmented or Virtual Reality (AR/VR) Companion Device Techniques", the entire disclosure of which is hereby incorporated by reference herein in its entirety.

BACKGROUND

Augmented or virtual reality (AR/VR) devices have been developed to provide a user with an interactive computer-generated experience with increased "immersion" over other computer experiences. In one example, virtual reality (VR) simulates an environment, whether real or fictional, by providing visual, auditory, and/or tactile feedback to a user. This may include rendering a dynamic three-dimensional (3D) view of the environment that visually moves with the user, audible output that corresponds to events occurring in the fictional environment, haptic sensors that provide tactile feedback based on the events, and so forth.

As another example, augmented reality (AR) merges a direct "real world" view of a physical environment, in which, the user is located with computer-generated output to enhance what is provided to the user and thus "augments" this real-world view. This may include overlaying computer-generated animations as part of this direct view, adding audio to real-world sounds, and so forth.

In both examples, the AR/VR devices may also implement natural user interfaces as a way to support user interaction with AR/VR environments, such as to body movements, hand gestures, head turns, and audible commands and initiate actions based on this user interaction. When interacting with the AR/VR environments, these natural interfaces mimic how the user would interact with the real-world, thus adding to the "immersion" a part of the user experience.

However, in some instances of AR/VR experiences, these natural interfaces can be less efficient, less intuitive, and cumbersome and are limited by the immersion promoted in AR/VR environments. To illustrate, consider an AR/VR environment that interfaces with a service provider system to allow a user to search for a particular product and/or make an in-experience purchase. In some instances, the service provider system requests the user enter a text-based search string, a user identification (ID), a password, and so forth to interact with these services. Conventional AR/VR devices, however, are typically ill configured to support this type of interaction. This may cause the user to first exit the AR/VR environment in order to interface with text entry fields, use the natural interfaces to enter the text-based input, and then return to into the AR/VR environment as part of modal interaction.

This not only disrupts the user's AR/VR experience, but can also cause frustration insofar as the natural interfaces do not allow the user to efficiently enter the text within a context of the AR/VR experience, i.e., is inefficient and/or does not support non-modal inputs. For example, the user may be required in conventional AR/VR devices to verbally spell out the text input one letter at a time using an audible natural interface. As another example, the user may be forced to navigate through a menu system and/or select one letter at a time through hand gestures. Since these interfaces can be less efficient relative to keyboards and/or touch screens, the user may quickly become frustrated and abandon the search or in-experience purchase. Further, this is also computationally inefficient and effects operation of the devices due to the inefficiencies in the user interaction. Thus, while natural interfaces provide an intuitive and instinctive way to interact with augmented and/or virtual worlds, the natural interfaces still suffer from limitations that may cause users to forgo these experiences.

SUMMARY

Augmented or virtual reality (AR/VR) companion device techniques are described. These techniques are configured to overcome the challenges and inefficiencies of conventional techniques. In one example, companion device pairing to an augmented reality or virtual reality (AR/VR) device techniques and systems are described. These techniques overcome the limitations of conventional techniques by displaying pairing data obtained from a network address associated with a service provider system, and communicatively coupling a companion device with an AR/VR device in response to verifying the pairing data. The companion device receives companion data that can be used to generate a companion user interface that supports user interaction via the companion device to initiate an action as part of an AR/VR environment output by the AR/VR device. In response to receiving user input via the companion user interface to initiate an action, the companion device communicates the action to the AR/VR device to initiate the action.

In a second example, an AR/VR device determines a portion of a markup file that corresponds to an AR/VR scene of a plurality of AR/VR scenes in an AR/VR environment. The AR/VR device communicates the portion of the markup file to the companion device to cause the companion device to configure a companion user interface associated with initiating an action as part of the AR/VR scene. The AR/VR device receives input data from the companion device to initiate the action. The AR/VR device initiates the action for the AR/VR scene based on the input data. In some implementations, the AR/VR device detects a change from the AR/VR scene to another AR/VR scene, and communicates another portion of the markup file to the companion device that corresponds to the other AR/VR scene.

In a third example, a digital image is captured of pairing data displayed by a display device of a companion device using a camera of an AR/VR device. The AR/VR device verifies the pairing data, and pairs with the companion device as communicatively coupled such that the AR/VR device is configured to initiate an action as part of an AR/VR environment based on input data received from the companion device.

In a fourth example, a computing device executes an AR/VR environment, and communicates AR/VR data via a network to an AR/VR device to cause rendering of the AR/VR environment by the AR/VR device. The computing device can alternately or additionally communicate companion data via the network to a companion device that causes the companion device to generate a companion user interface at a display device of the companion device, where the companion user interface is user selectable to initiate an action within the AR/VR environment. In Implementations, the computing device receives protected data from the companion device generated via user interaction with the companion user interface, and executes the action as part of the AR/VR environment without exposing the protected data to the AR/VR device.

In a fifth example, an AR/VR hub receives a request via a network from a companion device for companion data that corresponds to an AR/VR application configured for execution by an AR/VR device. The AR/VR hub locates the companion data from a plurality of companion data stored via the AR/VR hub, and communicates the companion data to the companion device. The AR/VR hub can alternately or additionally synchronize execution of the companion data by the companion device with execution of the AR/VR application by the AR/VR device.

In a sixth example, an AR/VR application and markup files are generated that specify linkages between controls at a companion device and actions for respective scenes of the AR/VR application executed at an AR/VR device. A computing device receives inputs that generate an AR/VR application having a plurality of scenes and corresponding actions as part of user interaction with respective scenes of the plurality of scenes. The computing device can alternately or additionally receive input that generates a markup file that specifies the linkages between controls at a companion device and the actions of the respective scenes of the AR/VR application. Implementations store the markup file as associated with the AR/VR application.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 5 is a flow diagram depicting a procedure in an example implementation in which an AR/VR device pairs with a companion device through the use of a service provider.

FIG. 6 is a flow diagram depicting a procedure in an example implementation in which a companion device generates a companion user interface that can be used to initiate actions in an AR/VR environment at an AR/VR device.

DETAILED DESCRIPTION

Overview

Figure 1:
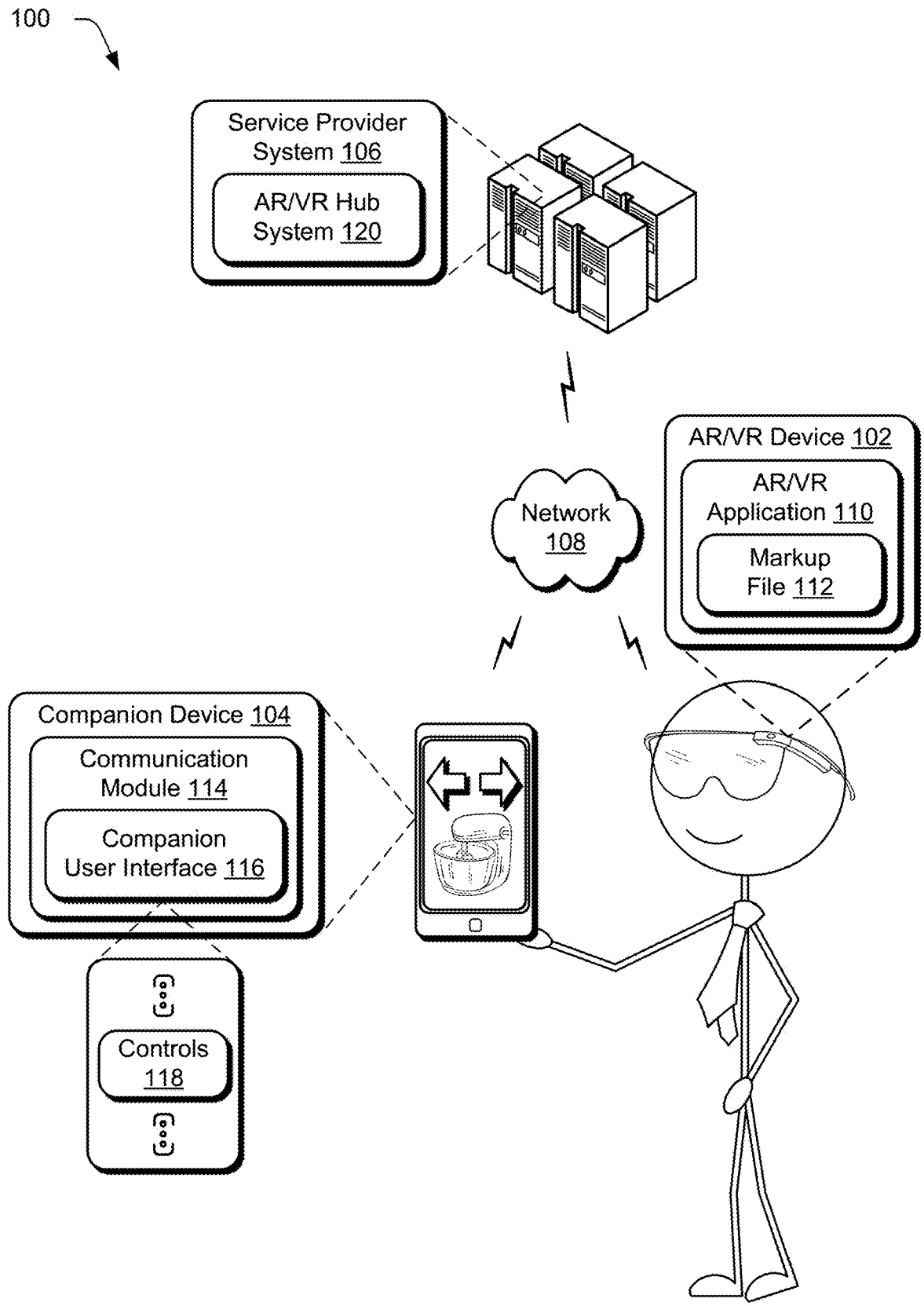
FIG. 1 is an illustration of an environment in an example implementation that is operable to employ augmented or virtual reality (AR/VR) companion device techniques described herein.

Augmented or virtual reality (AR/VR) devices are configured to immerse a user in an augmented or virtual reality experience by providing a variety of sensory inputs. For example, the AR/VR devices can render visual sensory inputs as 3D imagery that moves with the user, overlay computer-generated images on real-world images, output audio sensory inputs that simulate sounds in an AR/VR environment, deliver tactile feedback that simulates physical interactions in the environment, and so forth. The AR/VR devices can also receive inputs via natural user interfaces that mimic how the user would react to events in the real-world via gestures and motions that do not involve touch. While the natural user interfaces can enhance immersion of the user into the AR/VR experience, the natural user interfaces may encounter limitations regarding some types of inputs, such as text entry. Thus, conventional natural user interfaces may be challenged when trying to interact with service provider systems that involve significant amounts of text entry, such as online purchasing, online authentication, use of a search engine, social networking, and so forth.

To address these challenges, augmented or virtual reality (AR/VR) companion device techniques and systems are described that leverage a companion device in addition to an AR/VR device to increase user interaction within an AR/VR environment. The companion device may thus overcome the challenges of conventional techniques that are limited to an AR/VR device, alone. As part of this, the techniques described herein support pairing of the companion device with the AR/VR device. The techniques also leverage use of a companion user interface by a companion device and communication of portions of a markup file to the companion device that correspond to respective scenes of an AR/VR environment rendered by an AR/VR device. An AR/VR hub system is also described that supports generation of AR/VR application and markup files (e.g., as part of a software development kit) by a developer, synchronization of the companion user interface of the companion device with an AR/VR environment of the AR/VR device, and use of separate communication channels to protect data from exposure between the devices. As a result, the companion device techniques and AR/VR hub system described herein may increase user interaction with increased computational efficiency, e.g., through leveraging hardware and software "strengths" of the individual devices in supporting user interaction with the AR/VR environment, together.

In the pairing example, an AR/VR device pairs with a companion device to provide an alternative input mechanism to the user as part of interacting with an AR/VR environment output by the AR/VR device. Once paired, a user input received via a keyboard at the paired companion device, for instance, may be used to initiate a corresponding action at the AR/VR device, e.g., to enter text. Techniques used to pair an AR/VR device with a companion device encounter a variety of challenges in order to establish and synchronize communications between the devices. In one such challenge, pairing the devices is configured to avoid connecting to the wrong companion device and prevent rogue devices from accessing functionality shared between the paired devices. Conventional techniques to do so, however, require significant amounts of manual data entry by both devices, which, as stated above may be frustrating and inefficient, especially for entry by the AR/VR device.

Another challenge in pairing the devices is to ensure that an input entered at the companion device invokes a correct corresponding action at the AR/VR device. In other words, to ensure that the input at the companion device can be processed by a companion-side application that communicates with an AR/VR-side application and that initiates a desired action by the AR/VR device. Thus, pairing is also used to safeguard against incompatible applications, e.g., ensuring the application executing at the companion device is compatible with the application executing at the AR/VR device. Conventional techniques used to ensure compatibility, however, impact the development of each application, which is further exacerbated by conventional techniques that involve dedicated applications for each type of platform, i.e., operating system and/or device type.

Accordingly, techniques and systems are described that pair an AR/VR device with a companion device to leverage the capabilities at the companion device as a way to supplement functionality at the AR/VR device. Once paired, a user may then interact with a companion user interface to enter an input via a keyboard or touchscreen at the companion device, which is communicated to the AR/VR device to invoke a corresponding action.

In order to pair the device, the AR/VR device displays a network address of a service provider system, via which, pairing data is available. In one example, a generic application of the companion device, such as a browser, is used to access this network address rather than a dedicated companion application. In this way, the pairing data is accessible across a variety of platforms without special coding as opposed to conventional techniques that involve dedicated applications.

The pairing data is then received at the companion device, e.g., as an authentication code, a Quick Response (QR) code, and so forth. The pairing data is displayed on a display device of the companion device, and a digital image is captured using a front-facing camera by the AR/VR device. The AR/VR device may then verify the pairing data, and if valid, pair the companion device as communicatively coupled with the AR/VR device to interact with the AR/VR environment. The communicative coupling may be formed directly between the devices and/or indirectly through use of a service provider system via a network. In this way, the AR/VR device is paired with the companion device with minimal to no manual entry of text by a user with the AR/VR device, further discussion of which may be found in relation to FIGS. 2-6.

In another example, techniques and systems described herein also support rendering of the companion user interface by the companion device that is synchronized with rendering of an AR/VR environment of an AR/VR application by the AR/VR device. The AR/VR device, for instance, may execute an AR/VR application that includes multiple AR/VR scenes, where each AR/VR scene has respective actions. AR/VR scenes may include different views within a 360-degree AR/VR environment as well as different 360-degree environments and even to support movement within the environment. The companion user interface supports user interaction to initiate actions as part of the scene being rendered by the AR/VR device, and thus expands functionality of the AR/VR device. The companion user interface, for instance, may include controls that support user interaction to initiate respective actions, such as buttons, 3D models, digital images, spoken utterances, and so forth.

In order to generate the companion user interface, the AR/VR application is associated with a markup file. The markup file in this example is configured using platform independent languages (e.g., Hypertext Markup Language (HTML), Extensible Markup Language (XML)) and thus is usable across a wide range of platforms and device types. For example, this permits use of a general-purpose application (e.g., a browser) to process the markup file and thus may avoid use of platform-specific variations. A browser operating in an iOS® mobile operating system (OS), for instance, may process the same markup file as a browser operating in an Android® mobile OS.

In one instance, the markup file is included as an integral part of the AR/VR application. Therefore, a user downloading the AR/VR application to an AR/VR device automatically downloads the markup file. The bundling of an AR/VR application with a markup file also ensures a compatibility between the AR/VR application and the controls rendered as part of the companion user interface at the companion device, e.g., the controls rendered at the companion device correspond to a correct action at the AR/VR application. In another example, an AR/VR hub system at the service provider system manages the distribution of the markup file, or portions of the markup file, to the companion device, e.g., as part of an "app store."

During execution of the AR/VR application, the AR/VR device may output a variety of AR/VR scenes as part of an AR/VR environment as described above. As the AR/VR application transitions from one AR/VR scene to another AR/VR scene within an AR/VR environment, an AR/VR scene manager module at the AR/VR device analyzes the markup file to determine which portion of the markup file corresponds to a current scene being rendered by the AR/VR device. The AR/VR scene manager module then communicates the portion of the markup file as companion data to a paired companion device to generate the companion user interface.

The AR/VR scene manager module, for example, can determine a first portion of the markup file for a first AR/VR scene and communicate the first portion to the companion device. In changing AR/VR scenes, the AR/VR scene manager module can determine a second portion of the markup file for another AR/VR scene and communicate the second portion to the companion device. Once received, the companion device processes the companion data, e.g. the first portion of the markup file or the second portion of the markup file, to generate the companion user interface. The companion user interface, for instance, may include controls as part of the companion user interface that are linked to initiate an action in a current scene of the AR/VR environment.

In response to receiving user input via a control, for instance, the companion device sends input data describing the corresponding action to the AR/VR device, which is then executed by the AR/VR device as part of the AR/VR environment rendered by the AR/VR application. As one example, the companion device can render a rotation button that corresponds to a current scene in an AR/VR environment. When a user interacts with the rotation button, the companion device transmits a rotation action notification to the AR/VR device, and the AR/VR application executes the corresponding action. In this way, the companion user interface may be rendered as platform independent efficiently by computational and network resources of the companion device by communicating corresponding portions of the markup file. Further discussion of this example may be found in relation to FIGS. 7 and 8.

In a further example, an AR/VR hub system is described to manage creation of the AR/VR application and markup file as well as synchronization of interaction of the companion user interface with the AR/VR environment of the AR/VR application executed by the AR/VR device. The AR/VR hub system, for instance, may include an AR/VR application developer system that includes a software development kit (SDK) usable to code the AR/VR application as well as the companion data as the markup file. As part of this, linkages are specified between control of the markup file and actions of the AR/VR application and also linkages between scenes of the AR/VR environment and portions of the markup file to be communicated to the companion device. In this way, the markup file may be jointly created along with the AR/VR application, thereby improving user and computational efficiency and may do so in a platform independent format.

Conventional application development techniques, on the other hand, generate multiple variations of dedicated companion applications to support different operating systems. This adds complexity to the development cycle since adding an action to the AR/VR application corresponds to multiple changes in the variations of the dedicated companion application, e.g. a first change in the first variation, a second change in the second variation, and so forth. The conventional techniques are also susceptible to introduction of errors if a change in the first variation does not align with a change in the second variation.

Conversely, with the use of markup file via a platform independent format as supported by the techniques described herein, a developer may add a new action to a scene of the AR/VR application and simply modify a single markup file to support the new action through interaction with the SDK. When distributed, the single markup file synchronizes the control rendered at different types of companion devices to the new action, thus not only synchronizing the AR/VR application with the companion device, but synchronizing multiple platforms as well. Further discussion of this example may be found in relation to FIGS. 9-10.

In yet another example, the AR/VR hub system is used to manage the companion data used to generate the companion user interface by the companion device. For instance, a companion device may establish a connection to the AR/VR hub system and exchange communications with the system to facilitate the distribution of the markup files to the companion device to generate the companion user interface. The markup files in this example may originate from the AR/VR device and/or may be maintained by the AR/VR hub system, itself. This may also include communication of input data generated by user through interaction with the companion user interface to initiate the action by the AR/VR device. Distributing the AR/VR application and corresponding markup files via a hub ensures compatibility and synchronization between the AR/VR application at an AR/VR device and controls rendered at a companion device. In this way, the AR/VR hub system may also be used to synchronize the companion user interface of the companion device with the AR/VR application executed by the AR/VR device. Further discussion of this example may be found in relation to FIGS. 11-12.

In yet a further example, separate communication channels are supported between the AR/VR device and the companion device to protect against exposure of potentially sensitive data. Conventional communication techniques, one the other hand, may expose the potentially sensitive data, even when entered using separate input mechanisms that cause replication of the sensitive data and communication of the data through one of the devices. A conventional companion device, for instance, may be configured to communicate with a website as part of an AR/VR environment by communicating "through" an AR/VR device, or vice versa. Accordingly, in either scenario sensitive data may be exposed between the devices. A first input mechanism, for example, may reside at the AR/VR device that requests payment information or user credentials. A second input mechanism can similarly reside at the companion device to request the same sensitive data. The input mechanisms at multiple devices causes a duplication of the sensitive data, thus increasing the risk of exposure.

Conversely, through the use of separate secure communication channels to the service provider system as described in this example, sensitive data resident at the companion device can be utilized by the AR/VR device without duplicating the data, thus decreasing the risk of exposure. An AR/VR device, for instance, may establish a first communication channel (e.g., an AR/VR device communication channel) with a service provider system that is employed as part of an AR/VR environment (e.g., a webpage), while a companion device establishes a second communication channel (e.g. a companion device communication channel) with the service provider system. In this way, each of the devices may communicate with the service provider system without exposing potentially sensitive data to each other.

For example, a companion device may communicate protected data via a companion device communication channel to initiate a variety of actions at the service provider system without exposing this information to the AR/VR device. The protected data, for instance, may include a user credentials (e.g., user name and password) that are used to login to a web service implemented by the service provider system. Once verified, the service provider system may then permit access by the AR/VR device, thereby resulting in increased user efficiency in entering these credentials. In this way, the credentials remain secure and the AR/VR device may then join the AR/VR environment in an intuitive and efficient manner In another example, the protected information includes payment information (e.g., from an electronic "wallet" maintained at the companion device to complete a purchase with the service provider system without sharing that information with the AR/VR device nor without requiring the AR/VR device to enter this information, itself, which may be complicated using a natural user interface.

The AR/VR hub system may also include an AR/VR environment manager module that synchronizes actions and communications between the companion device and the AR/VR device. The AR/VR device, for instance, can transmit companion data over the first communication channel to the AR/VR hub system. The companion device receives the companion data over the second communication channel, and processes the companion data to render a control in a companion user interface associated with inputting sensitive data at a companion user interface, such as a purchase action button, a payment selection drop-down menu, a biometric entry field, a password text field, and so on.

When a user interacts with the control, the companion device performs corresponding functionality that accesses and/or transmits protected data over the second communication channel to the service provider system. The AR/VR environment manager module receives the protected data, and completes a corresponding action, such as completing a purchase at the service provider system using the protected data. Further, the AR/VR environment manager AR/VR hub system can perform the corresponding action without exposing the protected data to the AR/VR device.

An AR/VR application resident at an AR/VR device, for instance, can forward companion data over the first communication channel that corresponds to rendering a purchase action control for an item displayed in an AR/VR environment. The companion device receives the companion data over the second communication channel, and processes the companion data to render the purchase action control within a companion user interface. Upon selection of the purchase action control, the companion device can then forward payment information to an AR/VR environment manager module that completes the purchase of the item without exposing the payment information to the AR/VR device. This technique can also be applied to protected data resident at the AR/VR device. The AR/VR device, for example, can forward protected data over the first communication channel to the AR/VR environment manager module for consumption and without exposing the protected data to the companion device as described above.

In other examples, the AR/VR environment manager module forwards protected data received from a companion device over to the AR/VR device for use, such as for auto-populating fields displayed in an AR/VR environment at the AR/VR device. This mechanism thus reduces the exposure of the protected data relative to conventional techniques insofar as it reduces human interaction with the protected data, thus reducing how the protected data is exposed. Further discussion of these examples may be found in relation to FIGS. 13 and 14.

In the following discussion, an example environment is first described that may employ the techniques described herein. Example procedures and systems are also described and shown as blocks which may be performed in the example environment as well as other environments. Consequently, performance of the example procedures is not limited to the example environment and systems and the example environment and systems are not limited to performance of the example procedures.

Example Environment

FIG. 1 is an illustration of a digital medium environment 100 in an example implementation that is operable to employ augmented reality (AR) digital content companion device techniques described herein. The illustrated environment 100 includes an AR/VR device 102, a companion device 104, and a service provider system 106 that are communicatively coupled, one to another, via a network 108.

Computing devices that implement the AR/VR device 102, companion device 104, and service provider system 106 may be configured in a variety of ways. A computing device, for instance, may be configured as a desktop computer, a laptop computer, a mobile device (e.g., assuming a handheld configuration such as a tablet or mobile phone as illustrated for the companion device 104), configured to be worn (e.g., as a head as shown for the AR/VR device 102) and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown and described in some instances, a computing device may be representative of a plurality of different devices, such as multiple servers utilized by a business to perform operations "over the cloud" for the service provider system 106 as described in FIG. 15.

The AR/VR device 102 is illustrated as including an augmented or virtual reality (AR/VR) application 110 that is executable to support user interaction with an AR or VR environment. In augmented reality, digital content is rendered along with a user's view (direct or indirect) of a physical environment, in which the user is disposed. Thus, the digital content rendered by the AR/VR application in an AR/VR user interface (e.g., visual, audio, tactile) "augments" the user's view of the physical environment. In virtual reality, an entirety of a user's view is rendered by digital content as a virtual reality environment. Thus, the virtual reality environment replaces a user's view of a physical environment, in which, the user is disposed. In the following, "AR/VR" refers to either augmented reality or virtual reality. The AR/VR device may be configured in a variety of ways to support rendering of an AR/VR environment, including devices used to provide an immersive experience such as goggles glasses, handheld devices such as a mobile phone or tablet, and so on.

Through the use of sensors (e.g., accelerometers, processing of digital images captured by a digital camera), the AR/VR device 102 may determine "where a user is looking" and render a corresponding scene of an AR/VR environment. This is done in FIG. 1 through execution of an AR/VR application 110 by the AR/VR device 102. The AR/VR application 110 also includes a markup file 112 that is usable by a communication module 114 of the companion device 104 to generate a companion user interface 116. The companion user interface 116, for instance, may be rendered to include controls 118 that are configured to initiate corresponding actions of an AR/VR environment rendered by the AR/VR device 102. In this way, the companion user interface 116 may expand functionality available via the rendering of the AR/VR device.

The following sections describe a variety of techniques that support use of the companion device 104 and companion user interface 116 in operation with the AR/VR device 102. Pairing techniques are described in relation to FIGS. 2-6. Communication of portions of the markup file 112 to the companion device 104 that relate to a current scene being rendered by the AR/VR device 102 are described in relation to FIGS. 7 and 8. Creation of the AR/VR application 110 and markup file 112 through interaction with a software development kit received from an AR/VR hub system 120 is described in relation to FIGS. 9 and 10. Dissemination and synchronization of the markup file 112 by the AR/VR hub system 120 is described in relation to FIGS. 11 and 12. Use of separate communication channels to protect data is described in relation to FIGS. 13 and 14.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Pairing an AR/VR Device to a Companion Device

Figure 2:
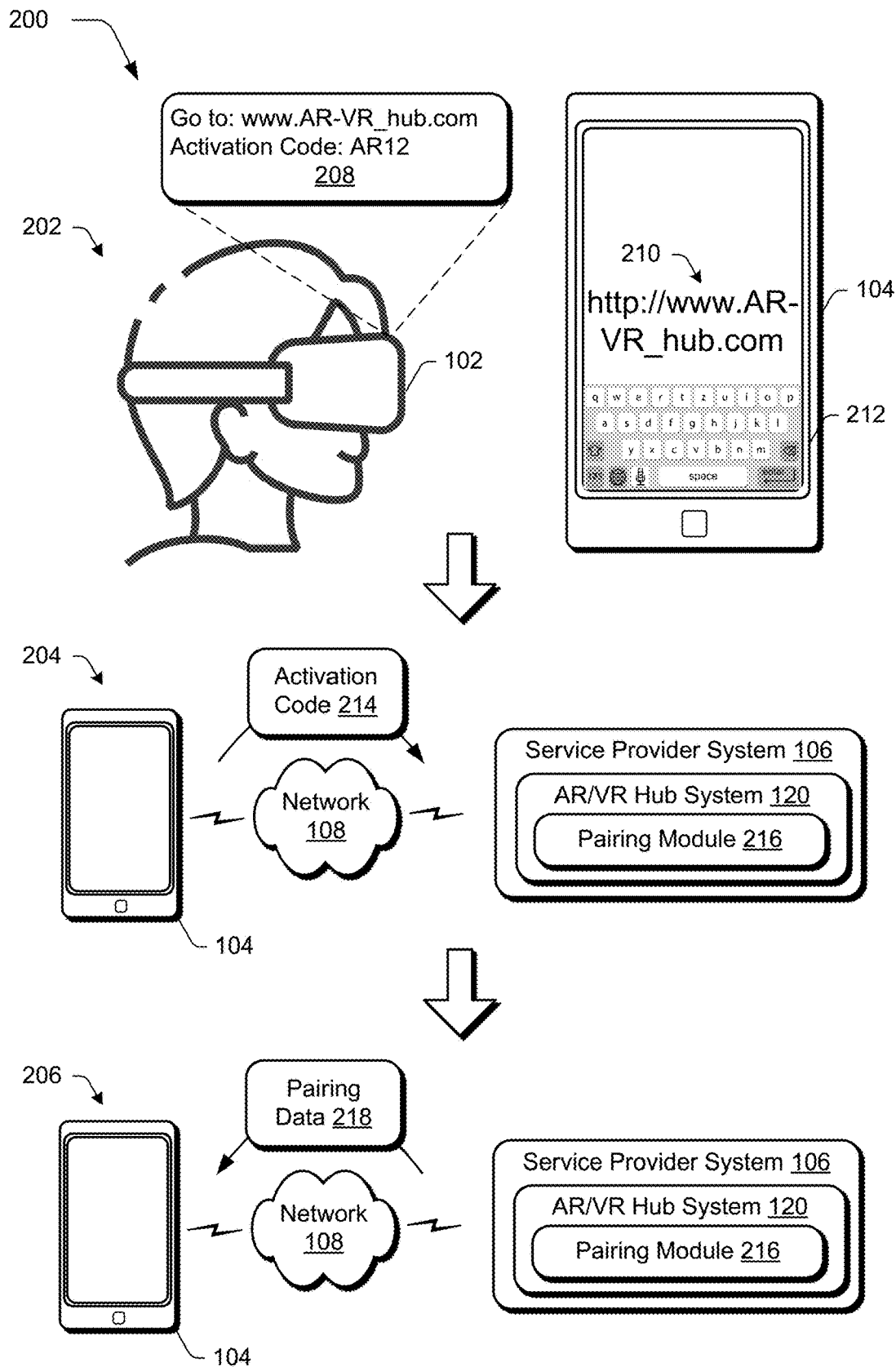
FIG. 2 depicts an example showing operation of an AR/VR device of FIG. 1 pairing with a companion device over a network.
Figure 3:
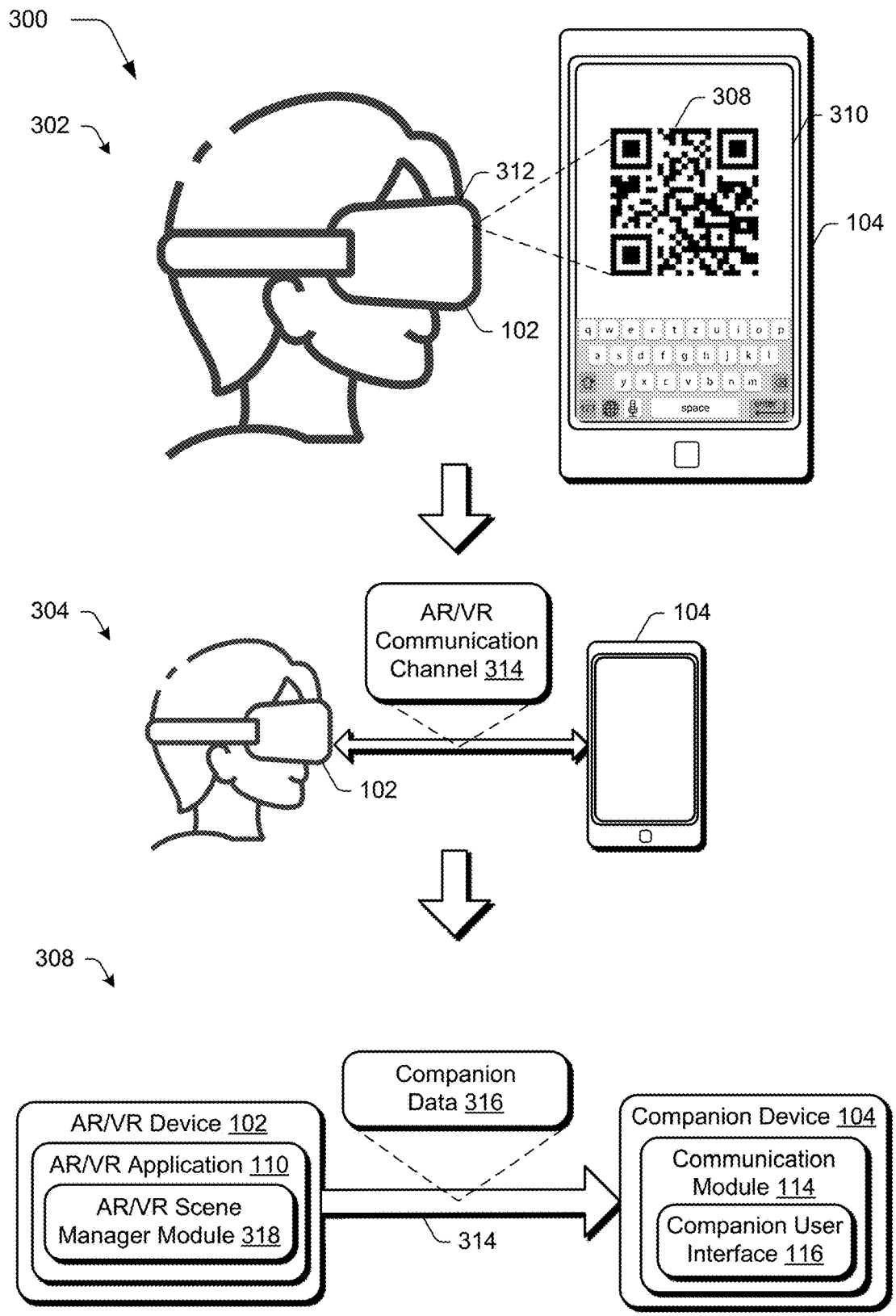
FIG. 3 illustrates an example that, in some implementations, can be considered a continuation of the example of FIG. 2, where the AR/VR device establishes a communication channel with the companion device to exchange companion data.
Figure 4:
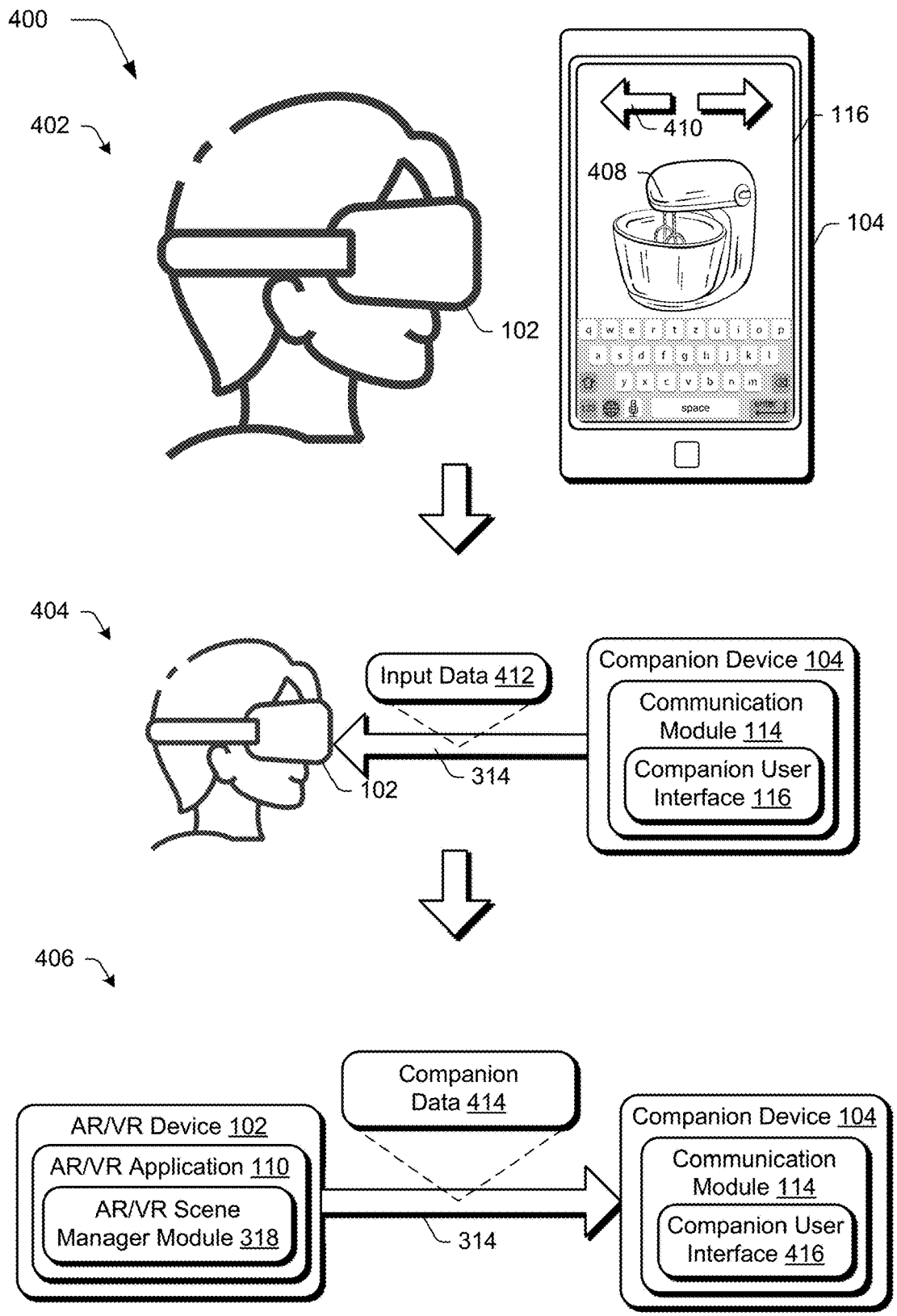
FIG. 4 depicts an example showing operation of the companion device as receiving input at a companion user interface and forwarding the input to the AR/VR device to invoke actions at the AR/VR device.

FIG. 2 depicts an example 200 showing operation of the AR/VR device 102 of FIG. 1 as pairing with the companion device 104 over the network 108. FIG. 3 illustrates an example 300 that, in some implementations, can be considered a continuation of the example 200, where the AR/VR device 102 establishes a communication channel with the companion device 104 to exchange companion data. FIG. 4 depicts an example 400 showing operation of the companion device 104 receiving input at a user interface and forwarding the input to the AR/VR device to invoke actions at the AR/VR device. FIG. 5 depicts a procedure 500 in an example implementation in which an AR/VR device pairs with a companion device through the use of a service provider. FIG. 6 depicts a procedure 600 in an example implementation in which a companion device generates a companion user interface that can be used to initiate actions in an AR/VR environment at an AR/VR device. The companion device receives input through the companion user interface, and communicates the input to the AR/VR device to initiate a corresponding action for the AR/VR environment.

The following discussion describes techniques that may be implemented utilizing the previously described systems and devices. Aspects of the example 200 as shown stepwise by the modules of FIGS. 2-4 may be implemented in hardware, firmware, software, or a combination thereof. In portions of the following discussion, reference is made interchangeably to FIGS. 2-6. Further, FIG. 2 depicts the example 200 of pairing an AR/VR device with a companion device through use of first, second, and third stages 202, 204, and 206.

To begin this example, at the first stage 202, the AR/VR device 102 displays a network address of a service provider system, via which, pairing data is available (block 502). To demonstrate, consider an example in which the user has downloaded an AR/VR application 110 to the AR/VR device 102, such as an AR/VR application that simulates navigation through an online marketplace. AR/VR scenes of the corresponding AR/VR environment output by the AR/VR device can include various types of actions associated with the online marketplace, such as item searching, item selection, item comparison, bid submissions, purchase transactions, item rotation, user preference configuring, auction updates, category browsing, help support, and so on. These actions can pertain to a particular AR/VR scene and/or multiple AR/VR scenes. For example, a searching action may be accessible on multiple AR/VR scenes, an item rotation action may only be accessible on an item view AR/VR scene, an auction update action may only be accessible on a main AR/VR scene, etc. Thus, each AR/VR scene can be associated with a unique combination of actions relative to other scenes.

In implementations, the user initiates pairing of the AR/VR device 102 with a companion device 104 to access input mechanisms directed to the action at the companion device that provide easier access to the action relative to the natural interfaces of the AR/VR device 102, such as a keyboard at the companion device 104 to enter a text-based search string, access functionality specific to the companion device 104 such as payment information, and so forth. To pair the AR/VR device 102 with the companion device 104, the user manually invokes the pairing process in one example, such as through audible input to the AR/VR device 102, through an input gesture at the AR/VR device 102, navigating through a menu of the AR/VR application 110, and so on. Alternately or additionally, the AR/VR device 102 may detect the presence of a companion device 104 and initiate the pairing process itself, i.e., automatically and without user intervention.

In initiating the paring process, the AR/VR device 102 displays the network address 208 that is associated with the service provider system 106 of FIG. 1. In the illustrated example 200, the AR/VR device 102 displays the network address 208 using a same display device that provides visual experiences to the user, e.g. the same display device used to provide visual experiences associated with an AR/VR application 110. The network address 208 can be displayed for a predetermined amount of time, until a timeout occurs, or until a successful pairing to a companion device 104 occurs. In another example, the AR/VR device 102 displays the network address 208 until user input associated with terminating the paring process is received. Here, the AR/VR device 102 displays the network address 208 concurrently with an activation code (e.g., "AR12").

At the second stage 204, the user manually enters network address 210 into a communication module 114 (e.g., a browser) of the companion device 104 (block 504), such as through the use of a keyboard 212. The network address 210 can be input at the companion device 104 via other input mechanisms as well, such as touch screen input, audible input, and so forth. In alternate or additional implementations, the AR/VR device 102 automatically communicates the network address 208 to the companion device 104, such as by broadcasting and/or transmitting the network address 208 using a wireless signal to the companion device 104 as network address 210. This can occur simultaneously with, and/or in lieu of, displaying the network address 208 at the AR/VR device 102.

Once the broadcast is detected and the network address is received, the companion device 104 can automatically enter the network address as navigation input to the communication module 114, e.g., the browser. Whether manually or automatically entered, the browser of the companion device 104 navigates to, and/or establishes a connection with, the service provider system 106 via the network 108 based on the network address 210. Here, the browser represents a general-purpose network navigation application, rather than a dedicated AR/VR companion application synchronized to the AR/VR application executing on the AR/VR device, but in alternate implementations, a dedicated AR/VR companion application can be utilized.

Moving to the second stage 204, the companion device 104 transmits authentication data to the network address and/or the service provider system 106 over the network 108 of FIG. 1. The browser of the companion device 104, for example, can render an input field that requests an activation code 214 based on instructions retrieved from the network address 210. In turn, the user can manually enter the activation code 214 into the text field (e.g., "AR12") based on the information displayed at the AR/VR device 102. Alternately or additionally, the AR/VR device 102 wirelessly transmits the activation code 214 to the companion device 104 over a local connection, such as over a Bluetooth connection, and the companion device 104 automatically populates the text field of the browser with the activation code 214. In response to receiving the activation code 214 in the text field, the browser transmits the activation code 214 to the service provider system 106.

The service provider system 106 analyzes the activation code 214 to authenticate the companion device 104. For instance, an AR/VR hub system 120 that resides at the service provider system 106 can include a pairing module 216, and use the pairing module 216 to authenticate the activation code 214. The AR/VR hub system 120, for example, can maintain a list of valid activation codes, distributed activation codes, software revision compatibility associated with activation code, and so forth. The pairing module 216 can then compare the received activation code with the maintained list to determine whether the activation code is valid or invalid. If the pairing module 216 determines that the activation code 214 is invalid, the pairing process terminates. However, in response to authenticating the companion device 104, the pairing module 216 determines to transmit pairing data 218 back to the companion device.

Moving to the third stage 206, the companion device 104 obtains pairing data 218 from the network address (block 506). As one example, the pairing module 216 generates a QR code as the pairing data 218 used between the companion device 104 and the AR/VR device 102. In other examples, the pairing module 216 can generate a digital certificate, a second authentication code, a verification code, a private/public key pair, a security question, a software token, and so forth, as the pairing data. In turn, the service provider system 106 transmits the pairing data 218 to the companion device 104 over the network 108.

FIG. 3 continues the example 200 of FIG. 2 also through use of first, second, and third stages 302, 304, 306. Aspects of the example 300 as shown stepwise by the modules of FIG. 3 may be implemented in hardware, firmware, software, or a combination thereof. At the first stage 302, the companion device 104 displays the pairing data 308 obtained from the network address on a display device 310 of the companion device 104 (block 508). For example, the browser can receive the network address 208 from the service provider system 106 as described with reference to FIG. 2, and render the pairing data 308 with instructions to the user, such as directions to input the pairing data into the AR/VR device 102. In this example, the browser renders the pairing data 308 on a display device 310 as a QR code, but other types of pairing data can be utilized, such as a second activation code, a password, a key, text, digital images, and so forth.

In implementations, the AR/VR device 102 captures a digital image of the pairing data 308 using a digital camera 312 (block 510), where the digital camera 312 corresponds to a front-facing camera of the AR/VR device 102. In alternate or additional implementations, the user can enter the pairing data using the natural user interfaces of the AR/VR device 102, such as audibly spelling a passcode. In response to capturing the digital image, the AR/VR device 102 verifies the pairing data (block 512). For example, the QR code can embed a key in the image. The AR/VR device 102 then analyzes the captured image of the QR code, and extracts the key which is then utilized to unlock companion device pairing features. The AR/VR device 102 alternately or additionally establishes a connection to the service provider system 106 over the network 108 of FIG. 1 using information embedded in the QR code. Thus, in this implementation the AR/VR device 102 forwards the pairing data to the service provider system 106 for verification.

Moving to the second stage 304, implementations pair the AR/VR device 102 as communicatively coupled with the companion device 104 in response to verifying the pairing data (block 514). For example, the AR/VR device 102 and the companion device 104 can establish an AR/VR communication channel 314 over the network 108, such as through the service provider system 106, through a local wireless connection, through a local wired connection, and so on. The AR/VR device 102 and companion device 104 can also employ cryptography to generate a secured communication channel between the devices, where encrypting and decrypting information (i.e., encryption keys) is embedded in the pairing data.

Some implementations prompt the user for input to establish the AR/VR communication channel 314. The AR/VR device, for instance, can display a menu that prompts the user to confirm an identity and/or type of the computing device, such as a menu that prompts the user to confirm whether the companion device 104 is an iPhone® 7, and iPhone® 8, a Samsung Galaxy® s10, and so forth. This can include the user entering input that selects a particular one of multiple devices and/or input that confirms a detected device type. While described in terms of a computing device type, alternate or additional implementations prompt the user to confirm other types of information, such as user identity, location identity, application identifiers, application revisions, and so forth. Thus, in establishing the AR/VR communication 314, various implementations prompt the user for additional input as part of a validation process, and/or provide additional information used, to establish the AR/VR communication channel 314.

At the third stage 306, the companion device 104 receives, in response to the pairing, companion data 316 from the AR/VR device (block 602). Here, the AR/VR device 102 communicates the companion data 316 to the companion device 104 over the AR/VR communication channel 314. The companion data 316 generally represents data that describes actions, controls and/or digital content associated with an AR/VR scene that is currently active at the AR/VR device, such as markup language that includes linkages to the actions. The markup language, for instance, may specify the actions that are used by the companion device 104 to select controls 118 for output in the companion user interface 116. In another instance, the markup language identifies the controls 118. Referring to the example of the online marketplace AR/VR application 110, the companion data can correspond to instructions that cause the companion device 104 to render a rotation action control in the companion user interface 116 for an item AR/VR scene at the AR/VR device 102, an auction compare control for a main AR/VR scene at the AR/VR device, and so forth.

In implementations, the AR/VR application 110 of FIG. 1 includes an AR/VR scene manager module 318 that identifies which AR/VR scene of the multiple scenes included in the AR/VR application 110 is currently active, e.g. the item scene, the main scene. In turn, the AR/VR scene manager module 318 selects the companion data 316 that corresponds to the currently active scene at the AR/VR device. The AR/VR scene manager module 318, for instance, can parse through a markup file 112 that is included as part of the AR/VR application 110 to identify a portion of the markup file 112 that corresponds to the currently active AR/VR scene as further described in relation to FIGS. 7 and 8. As another example, the AR/VR scene manager module 318 selects a particular markup file of companion data 316 from multiple markup files included as part of the AR/VR application 110, where the particular markup file includes the companion data 316 corresponding to the currently active scene. The companion data 316, as further described herein, includes instructions on rendering controls that are usable to initiate actions at the companion device 104, where the actions are performed by the AR/VR device 102.

In response to receiving the companion data 316, the companion device 104 generates a companion user interface 116 that supports user interaction via the companion device 104 to initiate an action as part of the AR/VR environment output associated with the AR/VR device 102 via the AR/VR application 110 (block 604). A browser, for example, processes the companion data 316 and displays the companion user interface 116 within a user interface of the browser. This can include rendering multiple action controls in the companion user interface 116, such as a search action text field, a category selection drop-down menu, an item selection radio button, a virtual keyboard, and so on. In implementations, the companion user interface 116 can receive and interpret particular input gestures as an action that corresponds to the currently active scene at the AR/VR device 102, such as a pinch input gesture being interpreted as a zoom-in or zoom-out action, a finger swipe as a select and move item action, etc. In rendering the companion user interface 116, the browser can select a particular control, from a plurality of controls 118 supported by the companion device 104, for inclusion as part of the companion user interface based on the companion data.

FIG. 4 continues the examples 200, 300 of FIG. 2 and FIG. 3 also through use of first, second, and third stages 402, 404, 406. Aspects of the example 400 as shown stepwise by the modules of FIG. 4 may be implemented in hardware, firmware, software, or a combination thereof. At the first stage 402, the companion device 104 displays the companion user interface 116 on a display device 322 of the companion device 104. In implementations, a browser of the companion device 104 processes the companion data 316 to render the companion user interface 116, but alternate markup language processing applications can be utilized, such as a general-purpose companion application dedicated to receiving and processing companion data from a plurality of AR/VR applications. Here, the companion user interface 116 corresponds to an AR/VR scene currently being displayed at the AR/VR device 102, and includes an item 408 for purchase at an online marketplace.

The companion user interface also includes a control 410 that corresponds to a rotate action that visually rotates the item 408 at the AR/VR device. For example, the control 410 displayed at the companion device includes a left-pointing arrow and a right-pointing arrow. A user can select the left-pointing arrow at the companion device, such as via a touchscreen interface, and cause the visual display of item 408 at the AR/VR device 102 to rotate clockwise. Thus, the companion device 104 receives a user input to initiate an action at the AR/VR device via the companion user interface 116 (block 606). While described as user input associated with a touchscreen interface, it is to be appreciated that any suitable type of user input can be received by the companion device to initiate an action, examples of which are provided herein.

Moving to the second stage 404, the companion device 104 communicates input data 412 for receipt by the AR/VR device 102 to initiate the action as part of the AR/VR environment (block 608). In the example 400, the companion device 104 transmits the input data 412 over the AR/VR communication channel 314 as further described herein. The input data 412 can be formatted in any suitable manner and can include any combination of data, such as a message that includes an action identifier, a scene identifier, a companion device identifier, a security key, a command, and so on.

The AR/VR device 102 receives the input data 412 (block 610), and initiates the action for the AR/VR environment output by the AR/VR device 102 based on the input data 412 (block 612). To illustrate, the AR/VR device 102 can extract an action identifier from the input data 412 to identify which action to take. Alternately or additionally, the AR/VR device 102 can extract a scene identifier from the input data to validate that the currently active scene corresponds to the input data. In response to validating the input data 412 and/or identifying a corresponding action, the AR/VR device 102 invokes the corresponding action in the AR/VR application 110. With reference to example 400, the AR/VR device 102 visually rotates item 408 in the AR/VR environment output at the AR/VR device 102 based upon the user interaction with the control 410 at the companion device 104.

At the third stage 406, the AR/VR application 110 has transitioned to a different scene that is associated with different actions. For instance, based upon the user providing input via the natural interfaces of the AR/VR device 102, the AR/VR device 102 can navigate from the currently active scene that corresponds to an item, to the different scene, such as a scene that corresponds to an auction search. Alternately or additionally, the user can provide input at the companion device 104 that corresponds to transitioning to the different scene.

In turn, the AR/VR scene manager module 318 identifies companion data 414 that generally describes controls and/or actions associated with the different scene. This can include the AR/VR scene manager module 318 parsing through a markup file 112 to identify the markup language instructions, or identifying a new markup file, associated with the different scene. The AR/VR device 102 then communicates the companion data 414 to the companion device 104 over the AR/VR communication channel 314. The companion device then processes the companion data 414, such as by way of a browser, to render action controls corresponding to the different scene at the companion device 104 as part of a modified companion user interface 416. The modified companion user interface 416 generally represent a companion user interface that renders controls as specified by companion data 414 and/or controls associated with actions of the different scene. Additional discussion of communication of portions relating to particular scenes rendered by the AR/VR device 102 is described in the following section.

Distributing Companion Data Based on an AR/VR Scene

Figure 7:
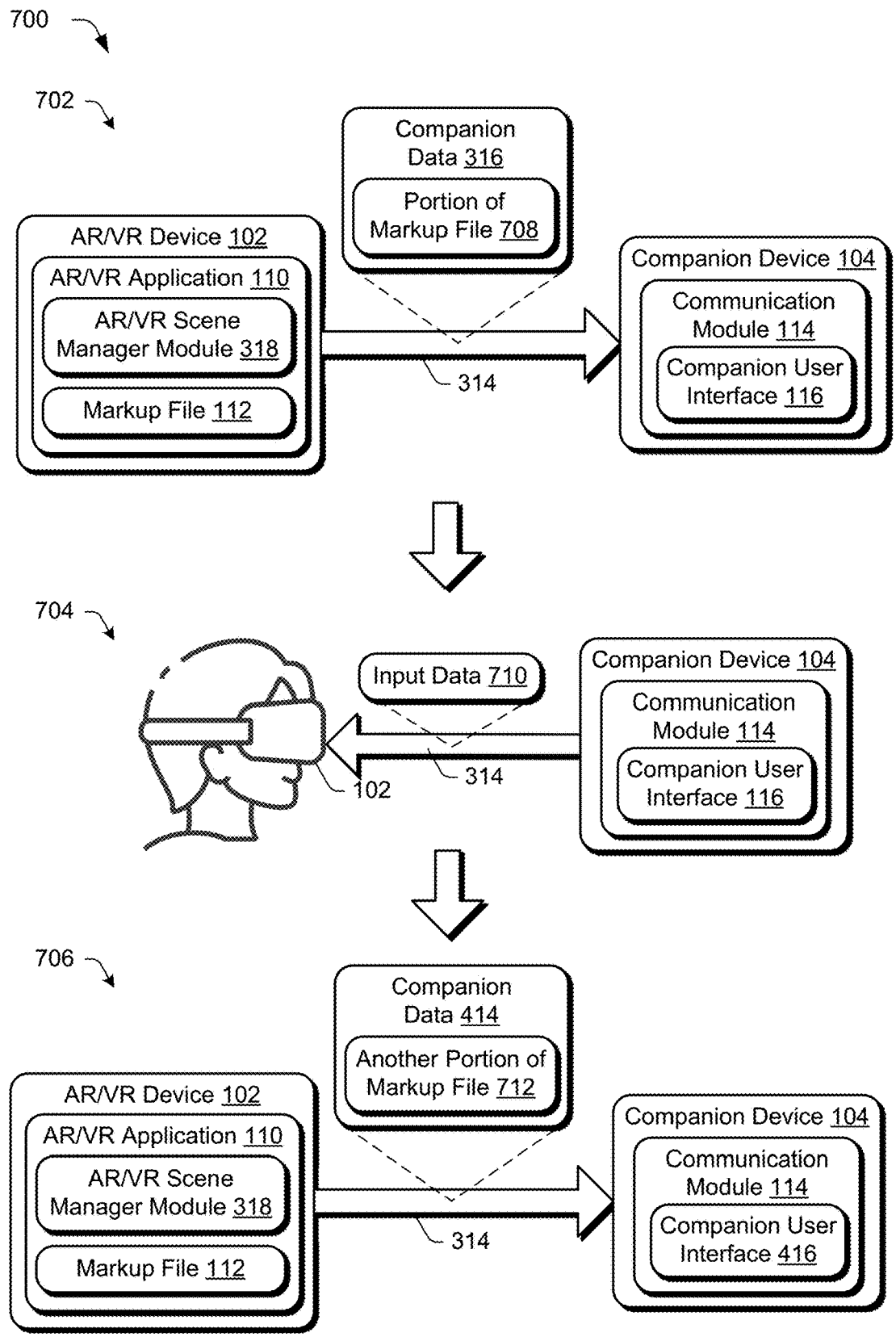
FIG. 7 is an illustration of an environment in an example implementation that is operable to employ augmented or virtual reality (AR/VR) companion device techniques described herein.
Figure 8:
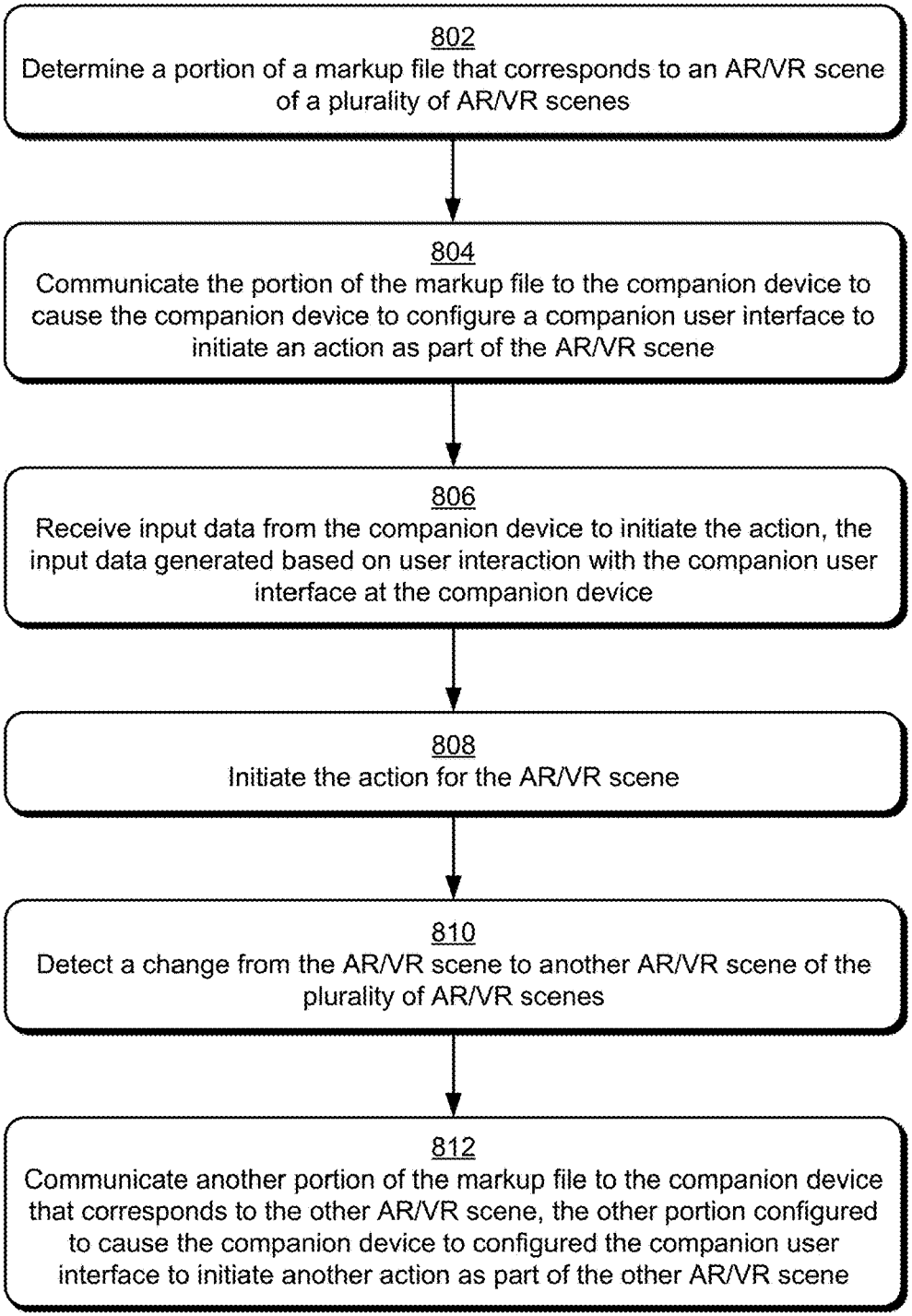
FIG. 8 is a flow diagram depicting a procedure in an example implementation in which an AR/VR device determines portions of a markup file to transmit to a companion device based on an AR/VR scene at the AR/VR device.

FIG. 7 depicts an example 700 showing operation of the AR/VR device 102 of FIG. 1 communicating companion data as portions to the companion device 104. The example 700 also shows operation of the companion device 104 communicating input data to the AR/VR device based upon user interaction with a companion user interface. FIG. 8 depicts a procedure 800 in an example implementation in which an AR/VR device 102 determines portions of a markup file to transmit to a companion device 104 based on an AR/VR scene at the AR/VR device 102. The procedure 800 also depicts transmitting input data from the companion device to the AR/VR device 102 effective to initiate actions at the AR/VR device 102.

The following discussion describes techniques that may be implemented utilizing the previously described systems and devices. Aspects of the example 700 as shown stepwise by the modules of FIG. 7 may be implemented in hardware, firmware, software, or a combination thereof. In portions of the following discussion, reference is made interchangeably to FIGS. 7 and 8. Further, FIG. 7 depicts the example 700 of transmitting companion data to a companion device based on an AR/VR scene at an AR/VR device, and initiating actions at the AR/VR device by a companion device, through use of first, second, and third stages 702, 704, and 706

In the illustrated example 700, the AR/VR device 102 includes the AR/VR application 110 and the markup file 112. The AR/VR device 102 provides an AR/VR experience to a user through the execution of the AR/VR application 110, which provides a plurality of AR/VR scenes. As further described herein, each AR/VR scene has respective actions that are described via the markup file 112. The example 700 also includes the companion device 104 of FIG. 1, where the companion device 104 and the AR/VR device 102 exchange data with one another through the AR/VR communication channel 314 of FIG. 3.

At the first stage 702, the AR/VR device 102 determines a portion 708 of a markup file 112 that corresponds to an AR/VR scene of the plurality of AR/VR scenes (block 802). The AR/VR application 110, for instance, can include the AR/VR scene manager module 318 of FIG. 3. The AR/VR scene manager module 318, when executed, generally synchronizes the distribution of companion data with AR/VR scenes active on the AR/VR device 102. In other words, the AR/VR scene manager module 318 identifies which AR/VR scene is currently active at the AR/VR device 102, determines portions of the markup file 112 that pertain to the AR/VR scene, and facilitates the distribution of those portions to a paired companion device 104. Alternately or additionally, the AR/VR scene manager module 318 receives input data from the companion device 104 and initiates a corresponding action within the AR/VR scene.

Determining the AR/VR scene being currently delivered via the AR/VR device can occur at any point in time during execution of the AR/VR application 110, such as at start-up of the AR/VR application 110, during a termination of the AR/VR application 110, or any other arbitrary point in time between. In one example, the AR/VR scene manager module 318 employs object-oriented techniques, where scene objects implement each respective AR/VR scene, and can be queried to provide status information about the scene (e.g., ACTIVE, INACTIVE). In another example, the AR/VR scene manager module 318 accesses library application programming interfaces (APIs) that provide scene state information. It is to be appreciated, however, that other techniques can be employed, such as managed lists, state variables, event triggers, and so forth.

The AR/VR scene manager module 318 analyzes the markup file 112 to identify markup instructions that correspond to the AR/VR scene that is currently active on the AR/VR device 102. In one example, the markup file 112 includes scene identifiers that partition markup language within the markup file based on scene identifiers. The markup file 112, for instance, can assign a first scene identifier to a first portion of markup language statements, a second scene identifier to a second portion of markup language statements, and so forth. The AR/VR scene manager module 318 can obtain the scene identifier of the AR/VR scene that is currently active, and parse through the markup file 112 to locate the corresponding portion of markup language statements.

In another example, the markup file 112 represents a plurality of markup files, each of which corresponds to a respective AR/VR scene. Each markup file 112 can include a scene identifier such that the AR/VR scene manager module 318 parses through the plurality of markup files to locate the markup file that includes the corresponding scene identifier. Alternately or additionally, each markup file 112 can employ a naming convention that indicates the corresponding scene identifier, and the AR/VR scene manager module 318 selects the markup file based upon matching the scene identifier to the naming convention. As yet another example, and referring to object-oriented implementations, a scene object can include references to a corresponding portion of markup file, and the AR/VR scene manager module 318 queries the scene object to determine the portion of markup file via the references.

The AR/VR device then communicates the portion 708 of the markup file 112 to the companion device 104. This causes the companion device 104 to configure a companion user interface 116 to initiate an action as part of the AR/VR scene (block 804). In the example 700, the AR/VR device includes the portion 708 of the markup file 112 in the companion data 316 of FIG. 3, and transmits the companion data 316, with the portion 708 of the markup file 112, to the companion device 104 over the AR/VR communication channel 314. This can include transmitting the companion data 316 indirectly through a service provider system 106, transmitting the companion data 316 directly over a local wireless connection, and so on. The companion device then processes the companion data 316 through the use of the communication module 114, e.g. a browser.

The companion device 104 receives the companion data and processes the portion of markup file to render the companion user interface 116 of FIG. 1, such as through a user interface of a browser. In rendering the companion user interface, the companion device can select a control to include in the companion user interface based on the companion data. The portion of markup file in the companion data, for instance, can specify an action and a corresponding control to assign to the action, such as a text field, a control button, a pull-down menu, a checkbox, a slider, a date field, and so forth. The companion device then selects the specified control to include on the companion user interface based upon the companion data.

Moving to the second stage 704, a user interacts with the companion user interface 116 through use of a control at the companion device to provide user input directed towards initiating an action at the AR/VR device 102. This can include any combination of user input, such as receiving selection of the control via a touch screen, entering text-based user input via a keyboard, entering a touch gesture at the touch screen, entering biometric data via a sensor, entering selection via the keyboard, and so forth, at the companion device. The companion device 104 then forwards input data 710 to the AR/VR device to initiate the action based on the user interaction with the companion user interface 116. In one example, the companion device 104 encrypts the input data 710, such as data encrypted through the use of a private/public key pair.

The input data 710 can specify any type of action supportable by the AR/VR device 102, such as a rotation action, a pan-left action, a pan-right action, a move action, a select action, a search action, a configuration action, an assignment action, a bid action, a cancel action, a purchase action, a change-scene action, and so forth. The input data 710 can also include any combination of data, such as an action identifier, a revision number, a companion device identifier, a timestamp, location data, and so on. In one example, the input data 710 specifies parameter(s) for a corresponding action. The companion user interface 116, for example can render multiple controls, such as a rotation arrow control that is coupled to a drop-down menu control. A user can enter a rotation degree via the drop-down menu control and then actuate the rotation arrow control. The corresponding input data 710 can include a rotate action identifier based on the actuation of the rotation arrow control, and a rotation degree parameter, e.g. 60° left, 90° right, 45° upward, 180° downward, and so forth, based on the drop-down menu control.

The AR/VR device 102 receives the input data 710 from the companion device 104 to initiate the action, where the input data 710 is generated based on user interaction with the companion user interface 116 at the companion device 104 (block 806). In the example 700, the AR/VR device 102 receives the input data 710 over the AR/VR communication channel 314. In turn, the AR/VR device 102 initiates the action for the AR/VR scene (block 808). In one example, the AR/VR scene manager module 318 at the AR/VR device 102 processes the input data 710 to determine a corresponding action to initiate, which can include identifying parameters used with the action. Referring to the rotation example, the AR/VR scene manager module 318 can analyze the input data 710 to determine that a clockwise rotation action of 90° has been initiated via the user input at the companion device 104. The AR/VR scene manager module 318 then initiates visually rotating the item in the corresponding item AR/VR scene.

To initiate the action, the AR/VR scene manager module 318 may implement various types of validation, such as validating the input data 710 through the use of a checksum, validating the input data based upon a public/private key, validating the requested action based on an action identifier included in the input data, validating the companion device based upon a companion device identifier in the input data, etc. If the various validations fail, the AR/VR scene manager module 318 refrains from initiating the action. Conversely, if the various validations succeed, the AR/VR device 102 proceeds with initiating the action.

The third stage 706 corresponds to a point in time when the AR/VR device 102 detects a change from the AR/VR scene to another AR/VR scene of the plurality of AR/VR scenes (block 810). The AR/VR scene manager module 318, for example, can receive a notification of the change from a scene object. In another example, the change in AR/VR scene corresponds to a user entering input at the AR/VR device 102 that causes navigation to a new AR/VR scene, such as input that switches from an item view AR/VR scene to a main AR/VR scene of an online marketplace AR/VR application.

The AR/VR scene manager module 318 then correlates the input to a change in AR/VR scenes. In response to detecting the change from the AR/VR scene to another AR/VR scene, the AR/VR scene manager module 318 analyzes the markup file 112 and determines another portion 712 of the markup file 112 that corresponds to the new AR/VR scene, examples of which are provided herein. The AR/VR device 102 then communicates the other portion 712 of the markup file 112, e.g. the portion that corresponds to the new AR/VR scene, to the companion device 104. This causes the companion device to configure the companion user interface 416, such as a configuration associated with initiating another action as part of the other AR/VR scene (block 812).

Generating Markup Language Linked to AR/VR Scene Actions

Figure 9:
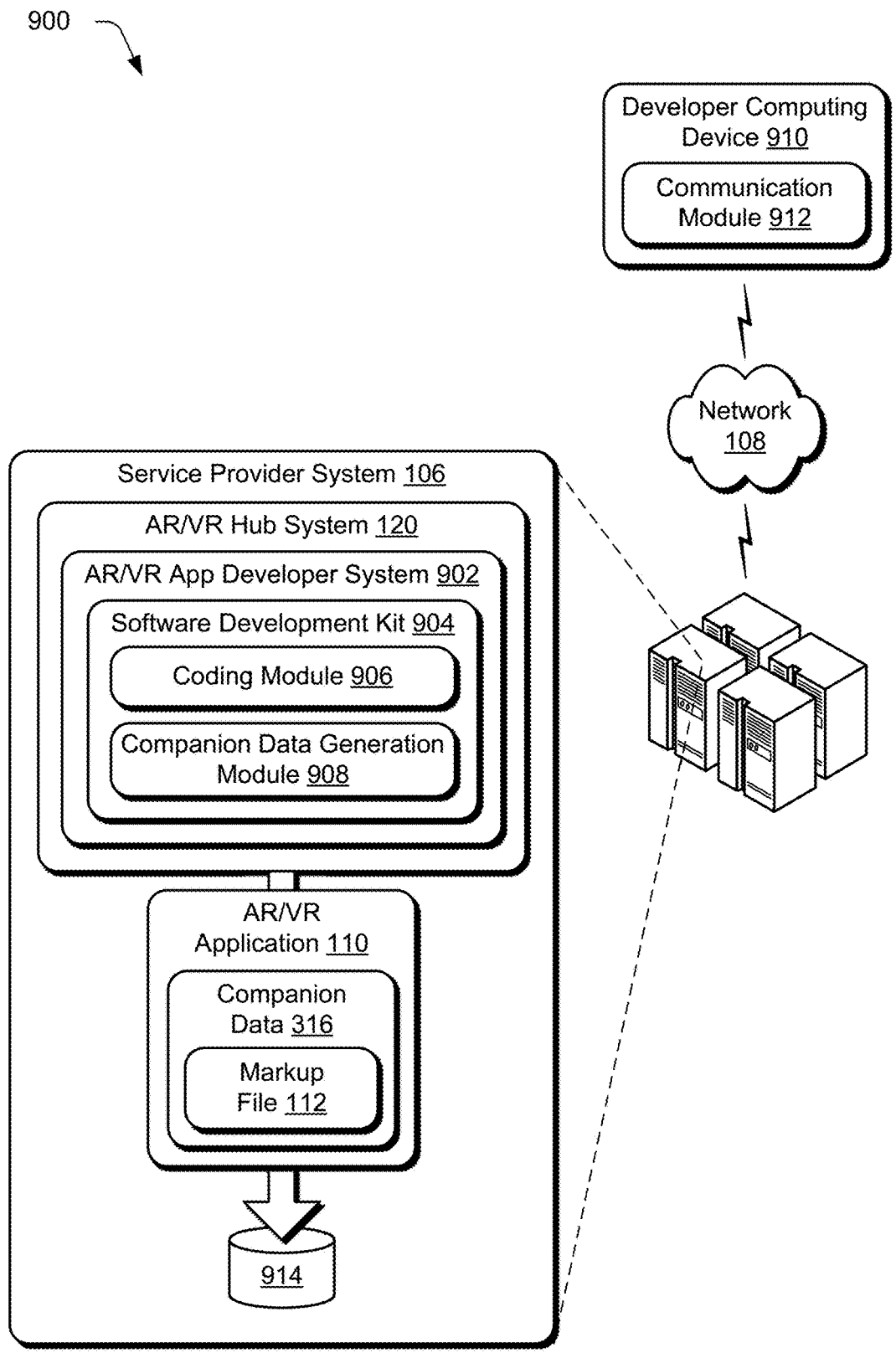
FIG. 9 is an illustration of an environment in an example implementation that is operable to employ augmented or virtual reality (AR/VR) companion device techniques described herein.
Figure 10:
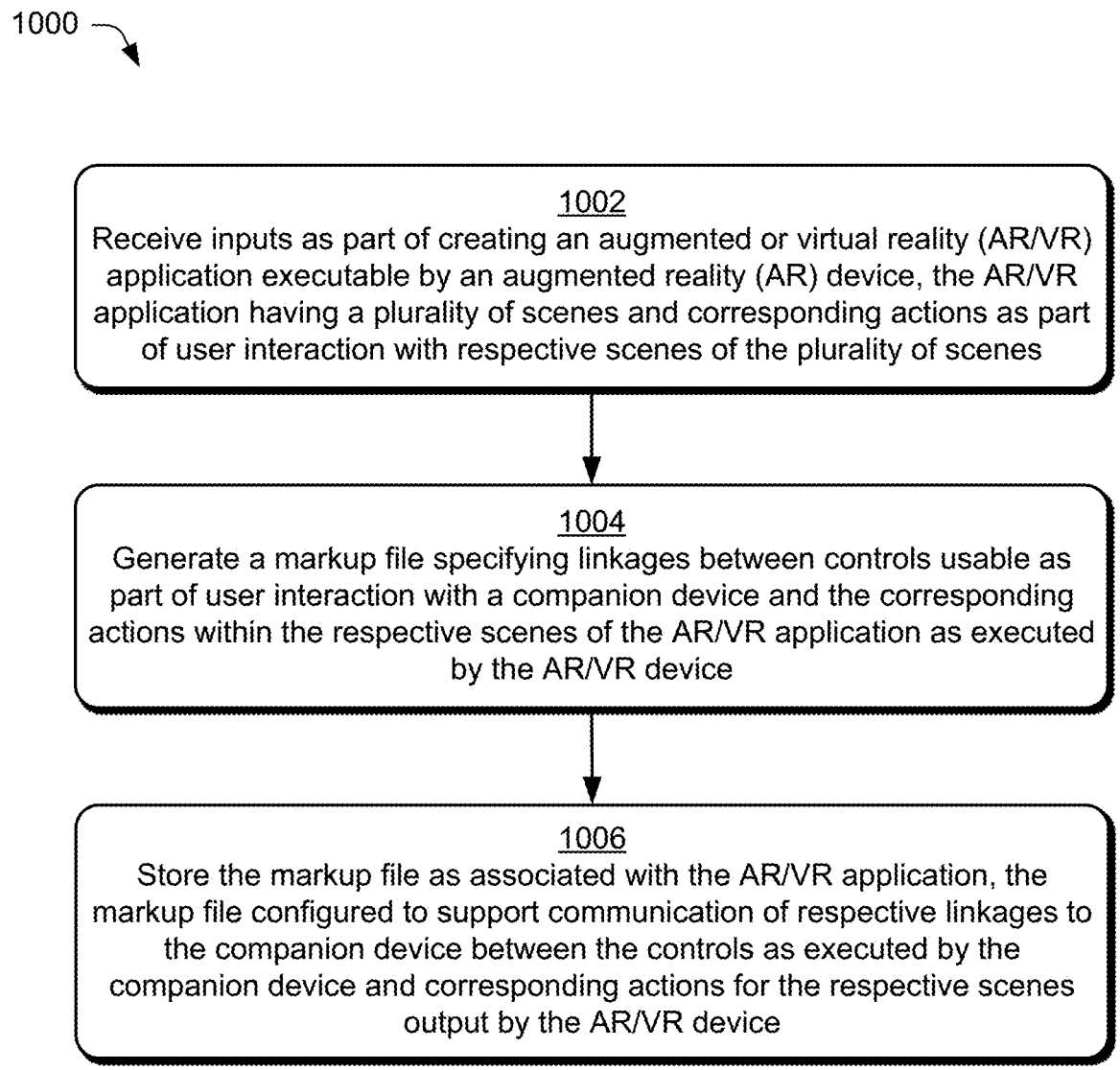
FIG. 10 is a flow diagram depicting a procedure in an example implementation in which a computing device generates markup language statements that are linked to AR/VR scenes as further described herein.

FIG. 9 is an illustration of a digital medium environment 900 that is operable to employ AR/VR digital content companion device techniques described herein. FIG. 10 depicts a procedure 1000 in an example implementation in which a computing device generates markup language statements that are linked to AR/VR scenes as further described herein.

The following discussion describes techniques that may be implemented utilizing the previously described systems and devices. Aspects of the environment 900 may be implemented in hardware, firmware, software, or a combination thereof. In portions of the following discussion, reference will be made to FIGS. 9 and 10.

In the environment 900, the service provider system 106 of FIG. 1 includes the AR/VR hub system 120, where the AR/VR hub system 120 maintains an AR/VR application (app) developer system 902. The AR/VR app developer system 902 generally represents any suitable type of system that can be utilized to develop an AR/VR application 110 and/or companion data 316, such as markup files 112. The AR/VR app developer system 902 can include any combination of software, hardware, and/or firmware. In one example, the AR/VR app developer system 902 includes a software development kit (SDK) 904 that generally represents a variety of software development tools and/or libraries.

The SDK 904 can include tools directed towards developing applications for particular platforms, such as tools to develop applications directed towards an iOS® platform, an Android® platform, a Windows® platform, a MAC® platform, and so forth. Thus, the SDK can include libraries particular to these platforms. The SDK can alternately or additionally include tools directed towards developing platform-independent functionality, such as Java script files, Hypertext Markup Language (HTML) files, Extensible Markup Language (XML) files, Python scripting files, and other types of markup files and/or platform-independent language files. The SDK 904 can include, for example editors, debuggers, linkers, compilers, drivers, libraries, and so forth, to generate platform-dependent and platform-independent code. Accordingly, the SDK 904 generally represents a collection of software development tools, such as Microsoft® Visual Studio, Xamarin, Microsoft® Azure, IntelliJ, and so on. Alternately or additionally, the SDK 904 can represent different software development tools that are independent from one another, e.g. a C++ editor from a first vendor, an HTML editor from a second vendor, etc.

The SDK 904 includes a coding module 906 that generally represents a coding module that is usable to generate platform-specific code, such as the AR/VR application 110. The coding module 906 can include a code editor and a variety of compilers and linkers, where each compiler/linker pair generates executable code for a respective platform. Alternately or additionally, the coding module can include script editors and/or scripting engines. In one example, a C# coding module includes a coding editor that receives user input, and translates the user input into C# statements. The coding module 906 can also selectively employ a particular compiler/linker pair out of the variety of complier/linker pairs such that compiling a source file with a first compiler/linker pair generates executable processor instructions for a first platform, compiling the source file with a second compiler/linker pair generates executable processor instructions for a second platform, etc. The coding module 906, however, can represent other types of coding modules that include scripting editors, coding editors, compilers, linkers, and so forth, such as C++, Java, Python, Lua, Objective C, JavaScript, HTML5, Papyrus, Cg, and so on. It is to be appreciated that, for discussion purposes, the description with respect to the generation of executable processor instructions has been simplified, and that the process can include additional or alternate actions, such as linking in platform-specific libraries, modifying platform-specific APIs, and so forth.

Similar to coding module 906, companion data generation module 908 generally represents a coding module that includes a coding editor configured to receive user input, and translate the user input into platform-independent statements, such as the markup file 112. In one example, the companion data generation module 908 includes an HTML editor, but alternate coding editors can be utilized for XML and so on. In the environment 900, the companion data generation module 908 is illustrated as being included in the SDK 904, but in alternate implementations, the companion data generation module 908 can be independent from the SDK.

The environment 900 also includes a developer computing device 910 that includes a communication module 912. In the environment 900, the communication module 912 provides the developer computing device 910 with connectivity to a network, such as network 108 of FIG. 1. Thus, the communication module 912 generally represents any combination of software, hardware, and/or firmware utilized to provides connectivity, e.g. protocol stacks, transmitters, receivers, etc.

Through this connectivity, the developer computing device 910 accesses the AR/VR app developer system 902 to develop the AR/VR application 110 and the markup file 112. In one example, the developer computing device 910 accesses a portion or all of the functionality provided by the AR/VR app developer system 902 over the network 108 to develop AR/VR applications 110 and/or markup files 112. In another example, the developer computing device 910 downloads a portion or all the AR/VR app developer system 902 from the service provider system 106, and accesses the corresponding functionality local to the developer computing device 910. In yet another example, the developer computing device 910 can obtain a portion or all of the AR/VR app developer system 902 via static means, such as a CD, a flash drive, etc.

The AR/VR app developer system 902 receive inputs as part of creating an augmented or virtual reality (AR/VR) application 110 executable by an augmented reality (AR) device, where the AR/VR application 110 can have a plurality of scenes and corresponding actions as part of user interaction with respective scenes of the plurality of scenes (block 1002). A code developer, for example, can develop a plurality of AR/VR scenes that are included in the AR/VR application 110 by interacting with the coding module 906.

The code developer can alternately or additionally add actions to the AR/VR scenes that can be initiated through user interaction with the AR/VR application 110, such as by natural interfaces and/or a companion device. The actions can be scene-specific and/or apply to multiple AR/VR scenes. An item view AR/VR scene, for example, can include a rotation action as further described herein. The code developer can also provide access to the rotation action via the input to the AR/VR app developer system 902, such as by entering input that generates an action API that exposes the rotation action.

The developer can also generate an AR/VR scene manager module 318 via input to the AR/VR app developer system 902, where the AR/VR scene manager module oversees the various AR/VR scenes included in the AR/VR application. This can include generating an AR/VR scene manager module 318 that determines which AR/VR scene is a currently active scene, and identifies portions of markup file 112 that correspond to the AR/VR scene that is currently active as described in the previous section.

The AR/VR app development system 902 can also generate a markup file 112 that specifies linkages between controls usable as part of user interaction with a companion device 104 and the corresponding actions within the respective scenes of the AR/VR application 110 as executed by the AR/VR device 102 (block 1004). A code developer, for example, can develop the markup file by interacting with the companion data generation module 908.

As one example, the code developer can enter input to the companion data generation module 908 that generates markup language that links an action API to an action identifier, specifies a control to display at a companion user interface 116 that links the control to the action identifier, links a first control at the companion user interface to a second control, and so forth. The markup language can alternately or additionally include scene identifiers, such as scene identifiers that indicate portions of markup language that correspond to a particular scene. Thus, the code developer can enter input to the companion data generation module 908 to generate markup language that indicates the corresponding actions to a particular AR/VR scene, controls that correspond to the actions, types of controls to render at a companion user interface, APIs that correspond to the actions, and so forth.

The code developer can also enter input to the companion data generation module 908 that stores the markup language in a markup file, such as markup file 112. In at least one example, the markup file 112 is configured using a markup language that is executable by a general-purpose application, such as a browser of a companion device 104.

To promote synchronization between a markup file 112 and a corresponding AR/VR application 110, the AR/VR app developer system 902 can be used to store the markup file 112 as associated with the AR/VR application 110 (block 1006). As further described herein, the markup file can be configured to support communication, to a companion device 104, of respective linkages between the controls 118 as executed by the companion device 104, and corresponding actions for the respective scenes output by the AR/VR device 102. In one example, the markup file 112 and the corresponding AR/VR application 110 are stored on the service provider system 106, such as in a storage device 914, such that a user downloading the AR/VR application 110 from the service provider system 106 also downloads the corresponding markup file 112 without additional user interactions, an example of which is further described in the following section.

Hub-Based Synchronization of Companion Data

Figure 11:
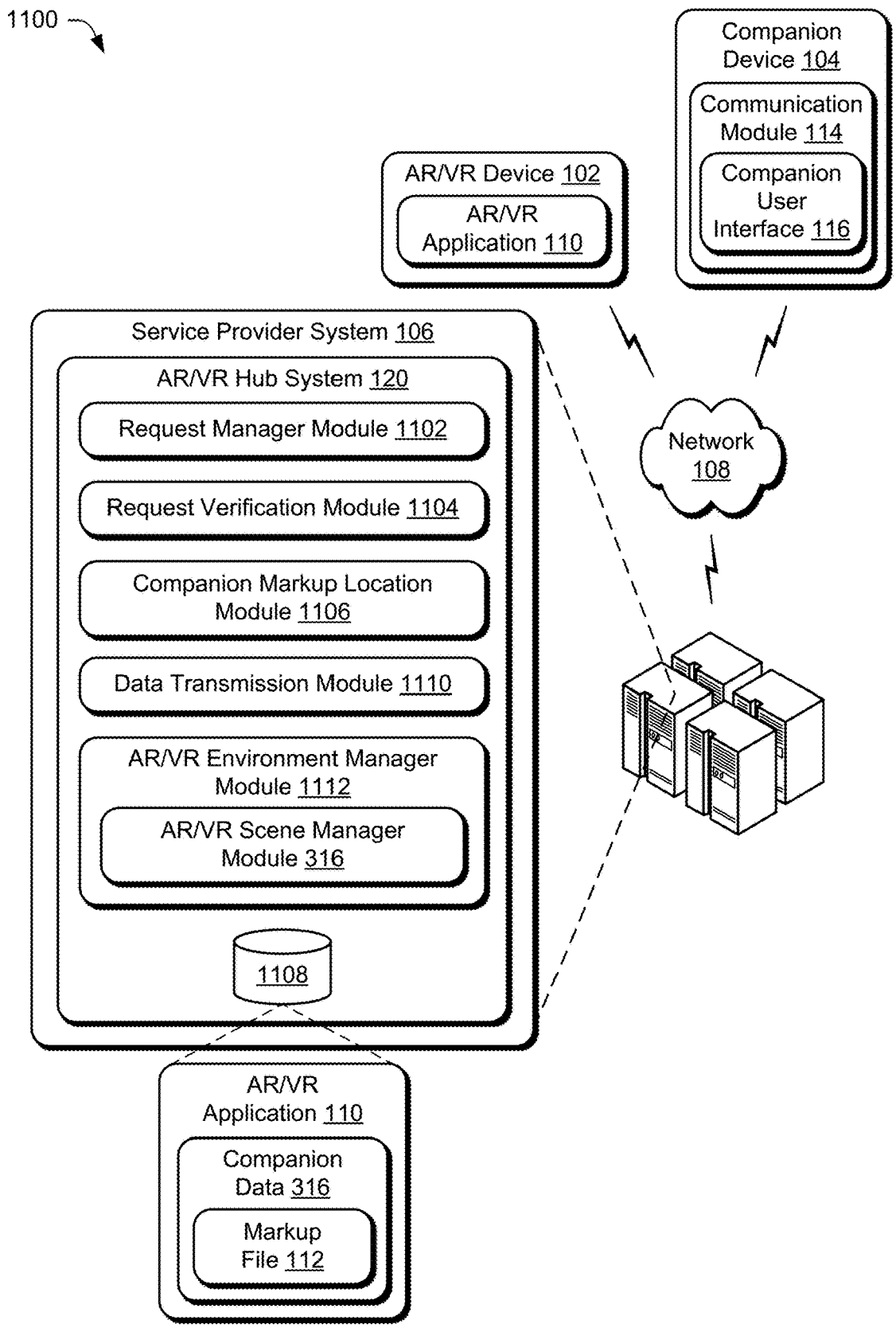
FIG. 11 is an illustration of an environment in an example implementation that is operable to employ augmented or virtual reality (AR/VR) companion device techniques described herein.
Figure 12:
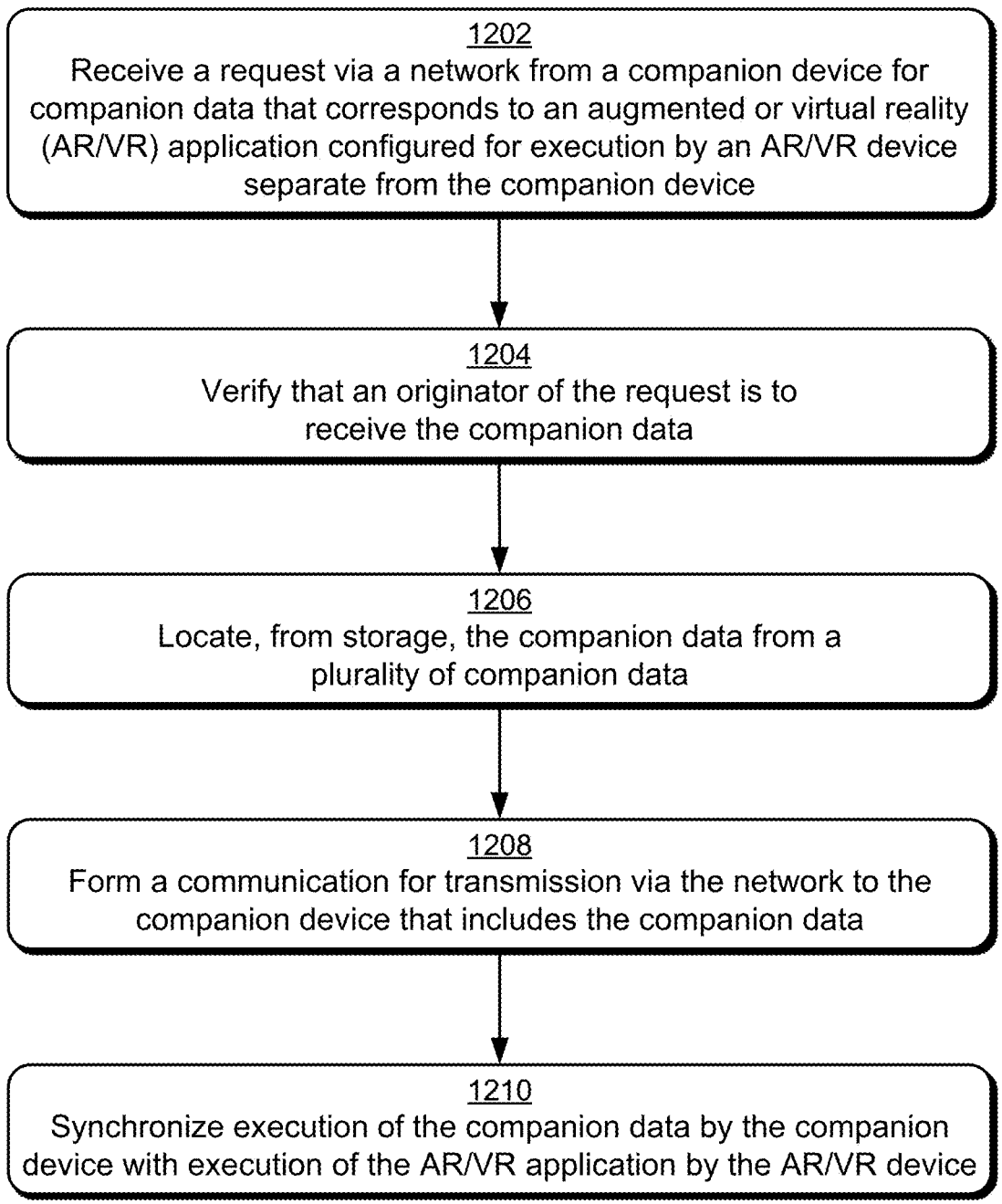
FIG. 12 is a flow diagram depicting a procedure in an example implementation in which a hub synchronizes the delivery of companion data to a companion device based on an AR/VR scene at an AR/VR device as further described herein.

FIG. 11 is an illustration of a digital medium environment 1100 that is operable to employ AR/VR digital content companion device techniques described herein. FIG. 12 depicts a procedure 1200 in an example implementation in which a hub synchronizes the delivery of companion data to a companion device based on an AR/VR scene at an AR/VR device as further described herein.

The following discussion describes techniques that may be implemented utilizing the previously described systems and devices. Aspects of the environment 1100 may be implemented in hardware, firmware, software, or a combination thereof. In portions of the following discussion, reference will be made to FIGS. 11 and 12.

The environment 1100 includes the service provider system 106, the AR/VR device 102, and the companion device 104 of FIG. 1. The service provider system 106 has established a first communication channel with the AR/VR device 102, and a second communication channel with the companion device 104. In implementations, the first and second communication channels facilitate the pairing of the AR/VR device 102 and the companion device 104. As such, the companion device 104 can be used to initiate actions at the AR/VR device 102. The AR/VR device 102, for example, includes the AR/VR application 110 of FIG. 1, and the companion device 104 renders the companion user interface 116 through the use of the communication module 114 of FIG. 1. A user can interact with controls rendered at the companion user interface 116 to initiate actions at the AR/VR device 102.

The service provider system 106 also includes the AR/VR hub system 120 of FIG. 1, where the AR/VR hub system 120 manages the distribution of companion data 316 to a companion device 104. The AR/VR hub system 120 includes a request manager module 1102 that can receive a request via the network 108 from the companion device 104 for companion data 316 that corresponds to an augmented or virtual reality (AR/VR) application 110 configured for execution by the AR/VR device 102. In the environment 1100, the companion device 104 sends a request corresponding to companion data for the AR/VR application 110. The companion device 104 can send a request for companion data 316 at any point in time, such as at an initial pairing with the AR/VR device 102, in response to receiving notification of the AR/VR device 102 invoking the AR/VR application 110, in response to receiving notification of a scene change, and so forth.

In one example, the request includes a scene identifier. For example, the AR/VR device 102 can notify the companion device 104 of a scene change and include the scene identifier in the notification. In turn, the notification triggers the companion device 104 to send the request, where the companion device 104 adds the scene identifier to the request. Alternately or additionally, the companion device 104 sends a request that includes an application identifier. For instance, the companion device 104 can query the AR/VR device 102 for the application identifier. In response to receiving the application identifier, the companion device 104 can include this information in the request for companion data 316. In yet another example, the companion device 104 sends a request for companion data 316, where the request indicates an AR/VR device 102 that the companion device is paired with, e.g. the AR/VR device 102. Thus, the companion device 104 can direct the request manager module 1102 to a particular AR/VR application 110 and/or a particular AR/VR scene. Alternately or additionally, the companion device 104 provides the request manager module 1102 with device information which can be used by the AR/VR hub system 120 to derive the AR/VR application 110 and/or AR/VR scene information as further described herein.

In response to receiving the request, the request manager module 1102 verifies that an originator of the request is to receive the companion data (block 1204). A request verification module 1104, for example, analyzes the request to validate that the companion device 104 has authority to receive the companion data 316 of FIG. 3 that corresponds to a scene of the AR/VR application 110. This can include validating the request via a public/private key pair, validating a companion device ID included in the request as being on an allowed device list, validating the companion device is paired with the AR/VR device, requesting validation from the AR/VR device 102, requesting authentication information from the companion device 104, and so forth.

In response to verifying the originator of the request, the AR/VR hub system 120 locates, from storage, the companion data 316 from a plurality of companion data (block 1206) that corresponds to the request. The AR/VR hub system 120 of the environment 1100 includes a companion markup location module 1106 that accesses a storage device 1108 to locate the companion data, e.g., companion data 316. In one example, the companion markup location module 1106 searches a storage device 1108 for the AR/VR application 110, and extracts the companion data 316 and/or the markup file 112 from the storage device 1108. The companion markup location module 1106 can base the search on any type of information, such as the scene identifier or the application identifier included in the request from the companion device 104.

Alternately or additionally, the AR/VR hub system 120 maintains a record of paired devices (e.g., a record that the AR/VR device 102 is paired to the companion device 104) and/or a record of what applications are being executed (e.g., the AR/VR application 110). The records can be maintained and updated based on information included in communications received and transmitted through the AR/VR hub system 120, such as communications from and to the AR/VR device 102 and the companion device 104. In turn, the companion markup location module 1106 accesses these records based on the companion device ID included in the request, and locates the companion data 316, such as by identifying the active application on the AR/VR device 102 paired to the companion device 104.

In another example, the AR/VR device 102 and the companion device 104 can register with the AR/VR hub system 120 as part of the pairing process, and update the AR/VR hub system 120 with information associated with the pairing, such as what AR/VR application 110 is executing, what AR/VR scene is currently active, when an AR/VR scene changes, and so forth. The information can include any combination of companion device identifiers, AR/VR device identifiers, AR/VR application identifiers, AR/VR scene identifiers, revision information, timestamp information, etc.

The AR/VR hub system 120 then forms a communication for transmission via the network to the companion device that includes the companion data (block 1208). This can include determining which portions of a markup file 112 to include in the companion data 316. The AR/VR hub system 120 in environment 1100, for example, includes an AR/VR environment manager module 1112 that synchronizes the distribution of companion data 316 to the companion device 104 and an AR/VR scene that is active at the AR/VR device 102. To help manage the synchronization, an AR/VR environment manager module 1112 can include a portion or all of the functionality of the AR/VR scene manager module 318 of FIG. 3 to determine portions of a markup file 112 associated with actions of the currently active AR/VR scene. The AR/VR environment manager module 1112 can identify and forward these portions of the markup file 112 to the data transmission module 1110 to include in the communication.

In some implementations, the AR/VR environment manager module 1112 delivers AR/VR data to the AR/VR device that causes the AR/VR device to provide an AR/VR environment with a plurality of scenes. The AR/VR environment manager module 1112, for example, can deliver cloud-based services to the AR/VR device as part of the AR/VR data used to provide the AR/VR environment. Any suitable type of cloud-based model and/or deployment mechanism across a network can be used in implement the AR/VR environment manager module, such as a Software as a Service (SaaS) model, a Platform as a Service (PaaS) model, an Infrastructure as a Service (IaaS) model, and so forth. Accordingly, the AR/VR environment manager module 1112 can deploy and synchronize an AR/VR environment at an AR/VR device with an companion device using any one or combination of these models.

The AR/VR hub system 120 synchronizes execution of the companion data 316 by the companion device 104 with execution of the AR/VR application 110 by the AR/VR device 102 (block 1210), such as by the AR/VR environment manager module 1112. This can include the synchronization of AR/VR scene transitions and companion data as described herein.

In implementations, the AR/VR environment manager module 1112 verifies the validity of transmitting the communication with the companion data to the companion device 104. For example, the AR/VR environment manager module 1112 can employ multiprocessor synchronization techniques that prevent the execution of AR/VR application 110 at the AR/VR device 102 from becoming out of sync with the companion user interface 116 displayed at the companion device 104, such as handshake-based messaging, multi-platform semaphores, etc. The AR/VR environment manager module 112 can alternately or additionally include a state machine that maintains scene state information. In some implementations, the AR/VR environment manager module provides cloud-base services utilized by the AR/VR device and the companion device that implement an AR/VR environment. The AR/VR hub system 120, for example, can direct the AR/VR application to wait to transition to a new scene until a confirmation from the companion device has been received. Upon receiving the confirmation from the companion device, the AR/VR hub system 120 can then direct the AR/VR application 110 to the transition to the new scene as described above. Communication between the companion device 104 and the AR/VR device 102 may be implemented in a variety of ways, examples of which are described in the following section.

Communicating Protected Data Between Paired Devices

Figure 13:
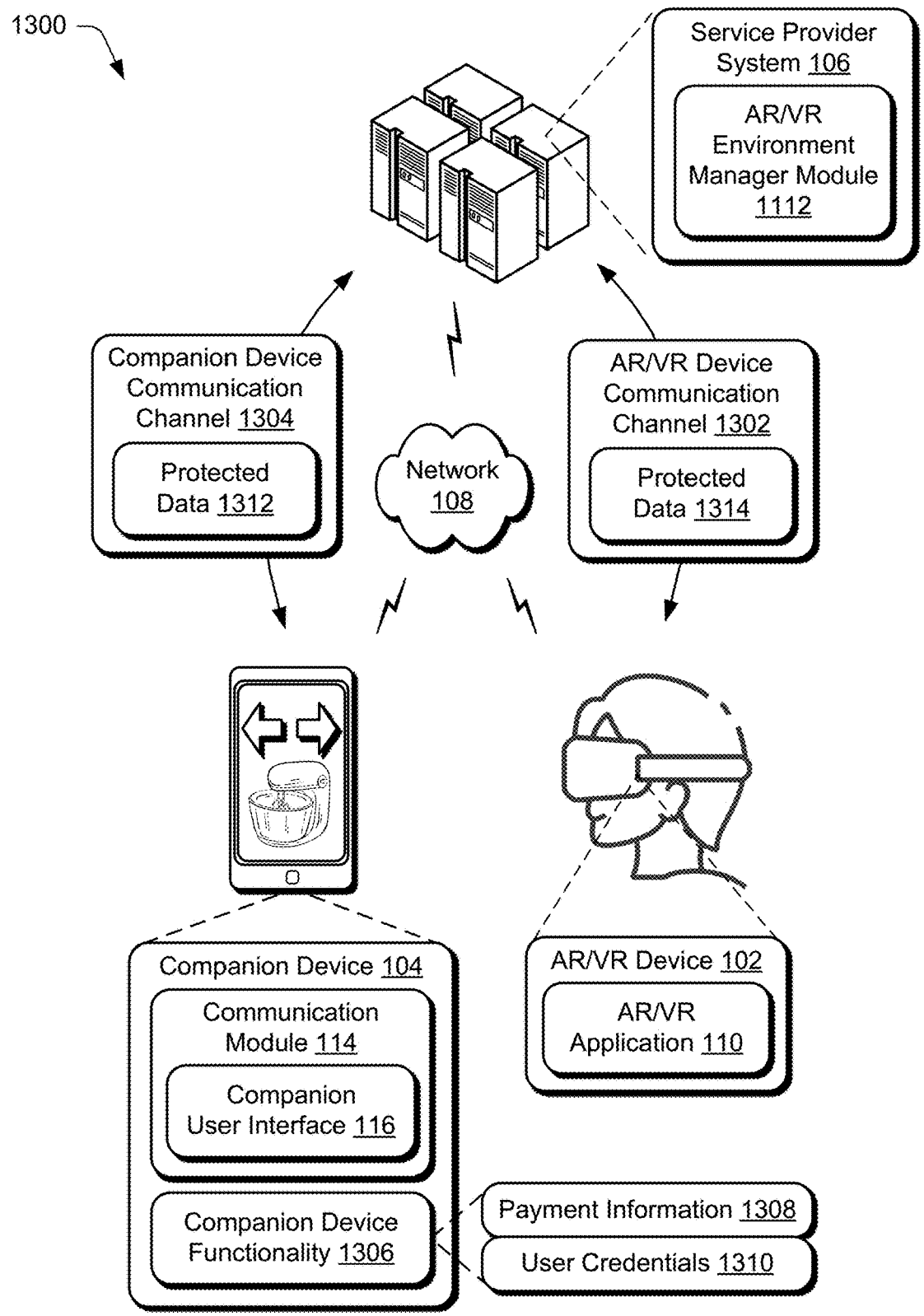
FIG. 13 is an illustration of an environment in an example implementation that is operable to employ augmented or virtual reality (AR/VR) companion device techniques described herein.
Figure 14:
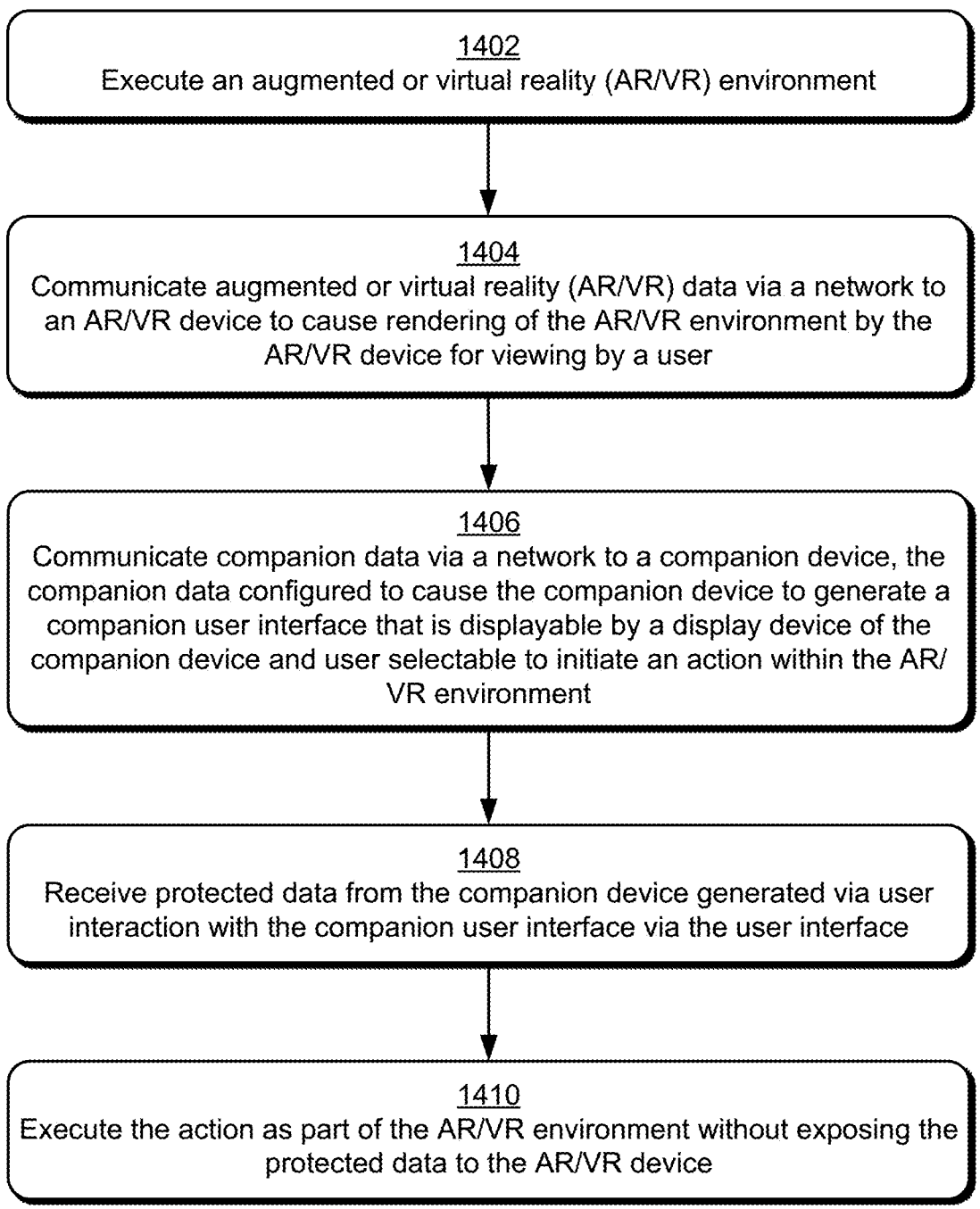
FIG. 14 is a flow diagram depicting a procedure in an example implementation in which computing devices synchronize the use of protected data between paired devices in an AR/VR environment as further described herein.

FIG. 13 is an illustration of a digital medium environment 1300 that is operable to employ AR/VR digital content companion device techniques described herein. FIG. 14 depicts a procedure 1400 in an example implementation in which computing devices synchronize the use of protected data between paired devices in an AR/VR environment.

The following discussion describes techniques that may be implemented utilizing the previously described systems and devices. Aspects of the environment 1300 may be implemented in hardware, firmware, software, or a combination thereof. In portions of the following discussion, reference will be made to FIGS. 13 and 14.

The environment 1300 includes the service provider system 106, the AR/VR device 102, and the companion device 104 of FIG. 1. The service provider system 106 includes the AR/VR environment manager module 1112 of FIG. 11. The AR/VR environment manager module 1112 facilitates synchronization between the AR/VR device 102 and the companion device 104. For instance, in the environment 1300, the service provider system 106 has established an AR/VR device communication channel 1302 with the AR/VR device 102 over the network 108 of FIG. 1, and a companion device communication channel 1304 with the companion device 104 over the network 108. The AR/VR environment manager module 1112 can designate what information is transmitted over these communication channels and when, such as communications used to pair the devices, companion data synchronized to AR/VR scenes, and protected data.

As described herein, the companion device 104 can be used to initiate actions at the AR/VR device 102. The AR/VR device 102, for example, includes the AR/VR application 110 of FIG. 1, and the companion device 104 renders the companion user interface 116 through the use of the communication module 114 of FIG. 1. A user can interact with controls rendered at the companion user interface 116 to initiate actions at the AR/VR device 102. This can include the transfer of protected data from the companion device 104 to the service provider system 106 and/or the AR/VR device 102.

The companion device 104, for instance, can include companion device functionality 1306 that generally represents any suitable application or action associated with protected data. In one example, the companion device functionality implements an electronic wallet that stores and manages payment information 1308, such as credit card information, bank account information, mobile payment information, gift card information, and so forth. Alternately or additionally, the companion device functionality includes a credential management system that stores and manages user credentials 1310, such as user identifications (IDs), passwords, digital certificates, and so forth.

In some instances, both the companion device 104 and the AR/VR device 102 may both access a third party, represented by the service provider system 106, to access functionality as part of an AR/VR environment, e.g., a website. Consider an example in which the AR/VR application 110 executes an AR/VR environment (block 1402), such as an item view AR/VR scene associated with an online marketplace of the service provider system 106. In implementations, the AR/VR environment manager module 1112 communicates AR/VR data via the network 108 to the AR/VR device 102 effective to cause rendering of the AR/VR environment by the AR/VR device 102 for viewing by a user (block 1404). In the illustrated example, the AR/VR data used to execute the AR/VR environment can be transmitted over the AR/VR device communication channel 1302.

To maintain synchronization between the AR/VR device 102 and the companion device 104, the AR/VR environment manager module 1112 communicates companion data 316 via a network 108 to the companion device 104, where the companion data 316 is configured to cause the companion device 104 to generate the companion user interface 116 (block 1406). As described herein, the companion user interface 116 renders controls on a display device of the companion device 104 that are user selectable to initiate an action within the AR/VR environment.

In implementations, the companion user interface 116 displays controls associated with purchasing the item displayed in the item view AR/VR scene at the AR/VR device 102. The controls, for instance, can correspond to a "Buy Now" action. Alternately or additionally, the companion user interface displays controls associated with logging into the online marketplace with a particular user profile.

In response to receiving the user interaction with the "Buy Now" control, the companion device 104 accesses the companion device functionality 1306 to acquire protected data 1312, e.g. the payment information and/or the user credentials. To acquire the protected data, the companion device 104 can render additional controls in the companion user interface 116 that allow the user to navigate and select particular data, such as a drop-down menu to select a credit card, a checkbox to select a user profile, etc. The companion device 104 extracts the protected data 1312 via the companion device functionality, and then transmits the protected data over the companion device communication channel 1304 to the service provider system 106. The companion device 104 can transmit the protected data with input data that designates an action, e.g. a "Buy Now" action, or transmit the protected data in a separate communication than the input data.

In implementations, the service provider system 106 may also forward protected data 1314 to the AR/VR device 102 over the AR/VR device communication channel, where the protected data 1314 corresponds to the protected data extracted from the companion device 104. Similar to the companion device 104, the service provider system 106 can also transmit the protected data with input data that designates an action, or transmit the protected data in a separate communication.

The service provider system 106 receives the protected data 1314 from the companion device, via the service provider system and/or the AR/VR environment manager module, over the AR/VR device communication channel 1302 (block 1408). As described herein, the protected data corresponds to protected data generated via user interaction with the companion user interface 116 via a user interface of the companion device 104. In turn, the service provider system 106 executes a corresponding action as part of the AR/VR environment without exposing the protected data to the AR/VR device 102 (block 1410). In the "Buy Now" example, the service provider system 106 can apply the payment information and/or the user credentials without exposure, as payment information and/or the user credentials as part of the online marketplace.

Thus, the AR/VR environment manager module 1112 manages the protected data 1312 without forwarding the protected data 1314 to the AR/VR device 102. The AR/VR environment manager module 1112, for example, can be communicatively coupled to the online marketplace. In receiving the protected data 1312, the AR/VR environment manager module 1112 distributes the protected data to the online marketplace without exposing the sensitive information to the AR/VR device. Since the AR/VR environment manager module 1112 facilitates synchronization between the AR/VR device 102 and the companion device 104, the AR/VR environment manager module 1112 can forward notifications to each device upon the completion, or failure, of the transaction. Such functionality is not possible in conventional techniques that involve communication of the data from the companion device 104 "through" the AR/VR device 102 as an intermediary.

Example System and Device

Figure 15:
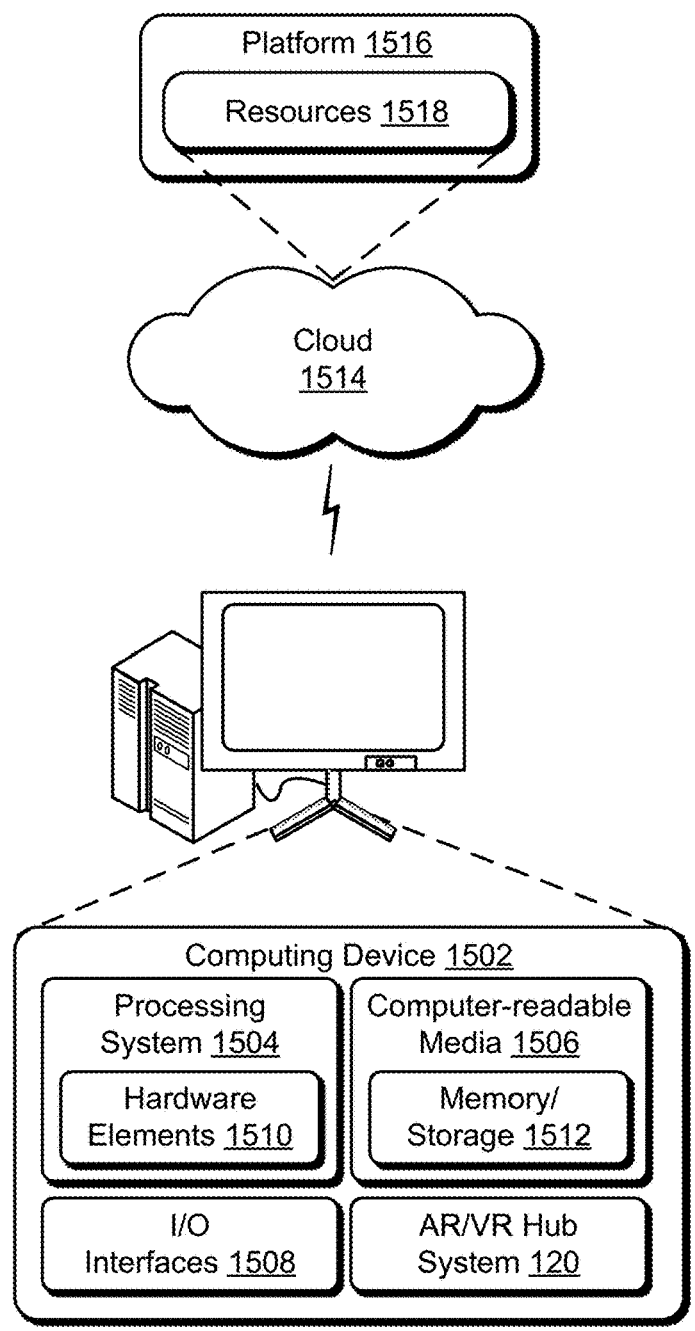
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the AR/VR hub system 120. The computing device 1502 may be, for example, a server of a service provider, a device associated with a client (e.g., a companion device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random-access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method as implemented by an augmented or virtual reality (AR/VR) hub separate from a companion device and an AR/VR device separate from the companion device, the method comprising:
communicating, by the AR/VR hub, AR/VR data to the AR/VR device to cause rendering of an AR/VR environment of an AR/VR application by the AR/VR device;
receiving, by the AR/VR hub from the companion device, a request corresponding to companion data that corresponds to the AR/VR application; and
responsive to receiving the request from the companion device, communicating, by the AR/VR hub, the companion data to the companion device, the companion data configured to cause the companion device to generate a companion user interface configured to display an AR/VR scene of the AR/VR environment that is concurrently rendered at the AR/VR device and a visual control that overlays the AR/VR scene of the AR/VR environment that is displayed by the companion user interface, the visual control being associated with purchasing, using the companion device, an item displayed on the AR/VR scene.

2. The method as described in claim 1, further comprising verifying, by the AR/VR hub, that the companion device of the request is to receive the companion data including validating that the companion device is paired with the AR/VR device and has authority to receive the companion data.

3. The method as described in claim 1, further comprising locating, by the AR/VR hub, from storage, the companion data from a plurality of companion data.

4. The method as described in claim 1, further comprising synchronizing, by the AR/VR hub, execution of the companion data by the companion device with execution of the AR/VR application by the AR/VR device.

5. The method as described in claim 1, further comprising receiving, by the AR/VR hub, protected data from the companion device without exposing the protected data to the AR/VR device wherein the protected data is selected from user login information or payment data.

6. The method as described in claim 1, wherein the communicating of the companion data further comprises determining a portion of a markup file to include in the companion data.

7. The method as described in claim 1, wherein the companion device provides at least one of a touchscreen or a keyboard with which a user interacts to complete the purchase of the item.

8. The method as described in claim 1, wherein the item displayed on the AR/VR scene is included in the AR/VR environment that is concurrently rendered at the AR/VR device.

9. A system comprising:
an AR/VR environment manager module implemented at least partially in hardware of a computing device to communicate AR/VR data to an AR/VR device to cause rendering of an AR/VR environment of an AR/VR application by an AR/VR device;
a request manager module implemented at least partially in hardware of the computing device to receive a request from a companion device via a network corresponding to companion data that corresponds to the AR/VR application; and
a data transmission module implemented at least partially in the hardware of the computing device to communicate, responsive to receiving the request from the companion device, the companion data to the companion device, the companion data configured to cause the companion device to generate a companion user interface configured to display an AR/VR scene of the AR/VR environment that is concurrently rendered at the AR/VR device and a visual control that overlays the AR/VR scene of the AR/VR environment that is displayed by the companion user interface, the visual control being associated with purchasing, using the companion device, an item displayed on the AR/VR scene.

10. The system as described in claim 9, further comprising a request verification module implemented at least partially in the hardware of the computing device to verify that a companion device of the request is to receive the companion data.

11. The system as described in claim 9, further comprising a companion markup location module implemented at least partially in the hardware of the computing device to locate, from storage, the companion data from a plurality of companion data, the companion data including a portion of a markup file.

12. The system as described in claim 9, wherein the AR/VR environment manager module further comprises being implemented at least partially in the hardware of the computing device to deliver cloud-based services to the AR/VR device as part of the AR/VR data delivered.

13. The system as described in claim 9, wherein the AR/VR environment manager module is further configured to synchronize execution of the companion data by the companion device with execution of the AR/VR application by the AR/VR device.

14. The system as described in claim 13, wherein the AR/VR environment manager module is further configured to synchronize the execution by:
determining a portion of a markup file that corresponds to an AR/VR scene of a plurality of AR/VR scenes of the AR/VR application that is rendered by the AR/VR device;
communicating the portion of the markup file to the companion device as the companion data;
detecting a change from the AR/VR scene to a different AR/VR scene of the plurality of AR/VR scenes; and
communicating a different portion of the markup file to the companion device that corresponds to the different AR/VR scene.

15. The system as described in claim 9, wherein the companion device provides at least one of a touchscreen or a keyboard with which a user interacts to complete the purchase of the item.

16. The system as described in claim 9, wherein the item displayed on the AR/VR scene is included in the AR/VR environment that is concurrently rendered at the AR/VR device.

17. A non-transitory computer-readable storage medium having computer-executable instructions which, when executed by a processor of a computing device, cause the computing device to:
communicate AR/VR data to an AR/VR device to cause rendering of an AR/VR environment of an AR/VR application by the AR/VR device;
receive from a companion device a request corresponding to companion data corresponding to the AR/VR application; and
communicate, responsive to receiving the request from the companion device, the companion data to the companion device, the companion data configured to cause the companion device to generate a companion user interface configured to display an AR/VR scene of the AR/VR environment that is concurrently rendered at the AR/VR device and a visual control that overlays the AR/VR scene of the AR/VR environment that is displayed by the companion user interface, the visual control being associated with purchasing, using the companion device, an item displayed on the AR/VR scene.

18. The non-transitory computer-readable storage medium as described in claim 17 having the computer-executable instructions which, when executed by the processor of the computing device, further comprise causing the computing device to receive protected data from the companion device without exposing the protected data to the AR/VR device.

19. The non-transitory computer-readable storage medium as described in claim 17, wherein the companion device provides at least one of a touchscreen or a keyboard with which a user interacts to complete the purchase of the item.

20. The non-transitory computer-readable storage medium as described in claim 17, wherein the item displayed on the AR/VR scene is included in the AR/VR environment that is concurrently rendered at the AR/VR device.

\* \* \* \* \*